(12) United States Patent
Park et al.

(10) Patent No.: US 9,239,647 B2
(45) Date of Patent: Jan. 19, 2016

(54) ELECTRONIC DEVICE AND METHOD FOR CHANGING AN OBJECT ACCORDING TO A BENDING STATE

(71) Applicant: Samsung Electronics Co., Ltd, Gyeonggi-do (KR)

(72) Inventors: Jung-Chul Park, Gyeonggi-do (KR); Young-Tae Jin, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/956,086

(22) Filed: Jul. 31, 2013

(65) Prior Publication Data

US 2014/0049492 A1    Feb. 20, 2014

(30) Foreign Application Priority Data

Aug. 20, 2012  (KR) .................. 10-2012-0090815

(51) Int. Cl.
*G06F 3/041*       (2006.01)
*G06F 3/0488*      (2013.01)
*G06F 1/16*        (2006.01)
*G06F 3/0487*      (2013.01)
*G06F 3/01*        (2006.01)

(52) U.S. Cl.
CPC ............ *G06F 3/0416* (2013.01); *G06F 1/1652* (2013.01); *G06F 3/017* (2013.01); *G06F 3/0487* (2013.01); *G06F 3/0488* (2013.01); G06F 2203/04104 (2013.01)

(58) Field of Classification Search
CPC .......... G06F 3/041; G06F 2203/04104; G06F 1/1652; G02F 1/167; G09G 2380/02
USPC .................. 345/173, 156, 107; 445/566
See application file for complete search history.

(56) References Cited

U.S. PATENT DOCUMENTS

| | | | |
|---|---|---|---|
| 8,385,987 B2 * | 2/2013 | Kim et al. ...................... | 455/574 |
| 8,466,873 B2 * | 6/2013 | Vertegaal et al. .............. | 345/156 |
| 2004/0008191 A1 | 1/2004 | Poupyrev et al. | |
| 2005/0052427 A1 | 3/2005 | Wu et al. | |
| 2006/0227114 A1 * | 10/2006 | Geaghan et al. .............. | 345/173 |
| 2007/0247422 A1 * | 10/2007 | Vertegaal et al. .............. | 345/156 |
| 2009/0315834 A1 * | 12/2009 | Nurmi et al. ................... | 345/173 |
| 2010/0056223 A1 * | 3/2010 | Choi et al. ..................... | 455/566 |
| 2010/0120470 A1 * | 5/2010 | Kim et al. ..................... | 455/566 |
| 2010/0141605 A1 | 6/2010 | Kang et al. | |
| 2011/0095999 A1 * | 4/2011 | Hayton ......................... | 345/173 |
| 2012/0052921 A1 * | 3/2012 | Lim et al. ..................... | 455/566 |
| 2012/0112994 A1 * | 5/2012 | Vertegaal et al. .............. | 345/156 |
| 2012/0139834 A1 * | 6/2012 | Han et al. ...................... | 345/157 |

(Continued)

FOREIGN PATENT DOCUMENTS

| KR | 10-2010-0052226 | 5/2010 |
|---|---|---|
| KR | 10-2012-0020394 | 3/2012 |

OTHER PUBLICATIONS

Extended European Search Report dated Jul. 15, 2014 in connection with European Patent Application No. EP 13179149.3, 8 pages.

*Primary Examiner* — Richardo L Osorio

(57) ABSTRACT

An electronic device and a method for changing an object according to a bending state. The method includes analyzing coordinates of touch areas to set an arbitrary area; checking that at least one object is included in the set area; and controlling a layout of the at least one object included in the set area according to a bending state.

26 Claims, 10 Drawing Sheets

(56) References Cited

U.S. PATENT DOCUMENTS

2013/0093660 A1* 4/2013 Hirsch et al. ............... 345/156
2013/0162546 A1* 6/2013 Yeh et al. .................... 345/173
2014/0002402 A1* 1/2014 Kang et al. ................. 345/173
2014/0062976 A1* 3/2014 Park et al. ................... 345/204
2014/0098028 A1* 4/2014 Kwak et al. ................. 345/173

* cited by examiner

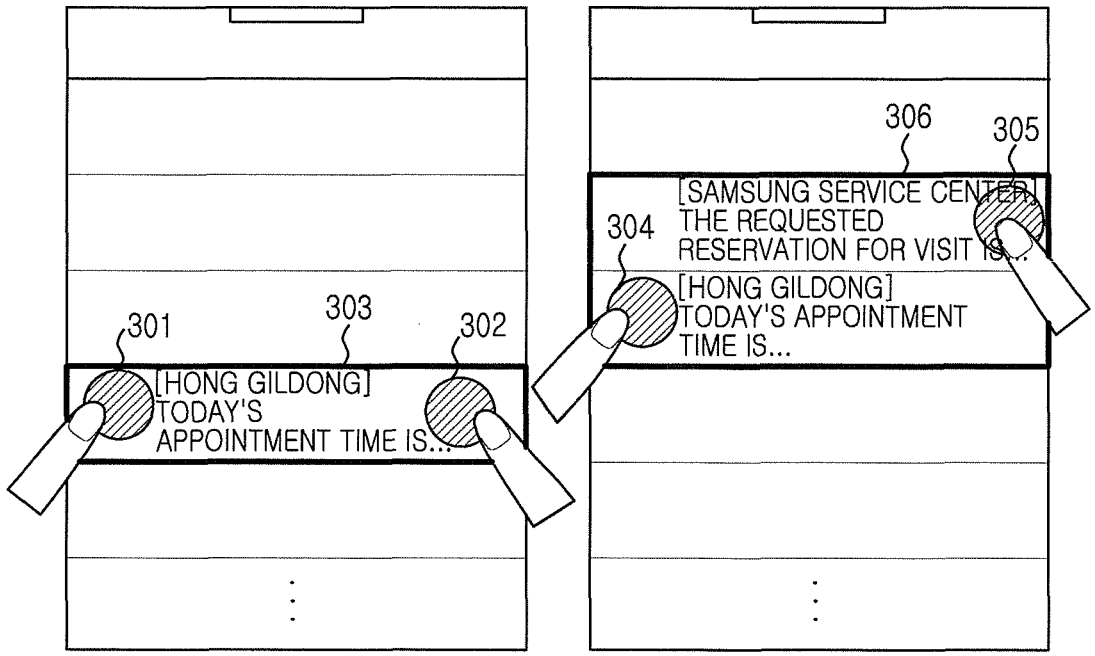
FIG.3A
FIG.3B
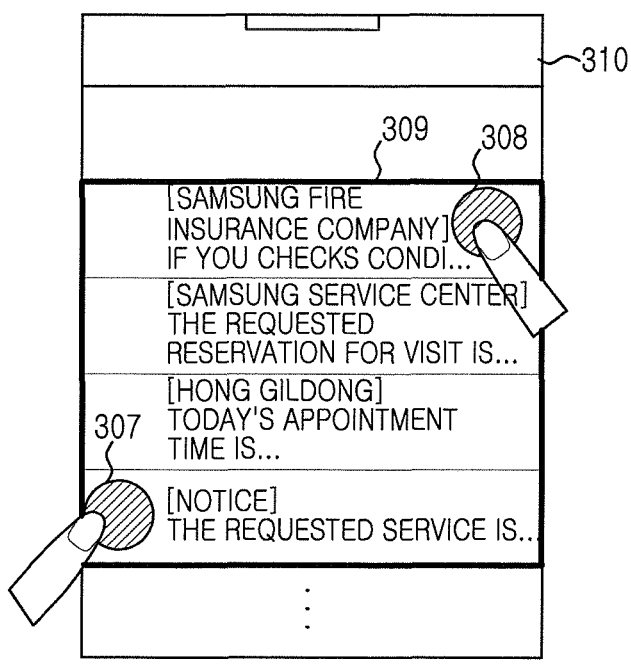
FIG.3C

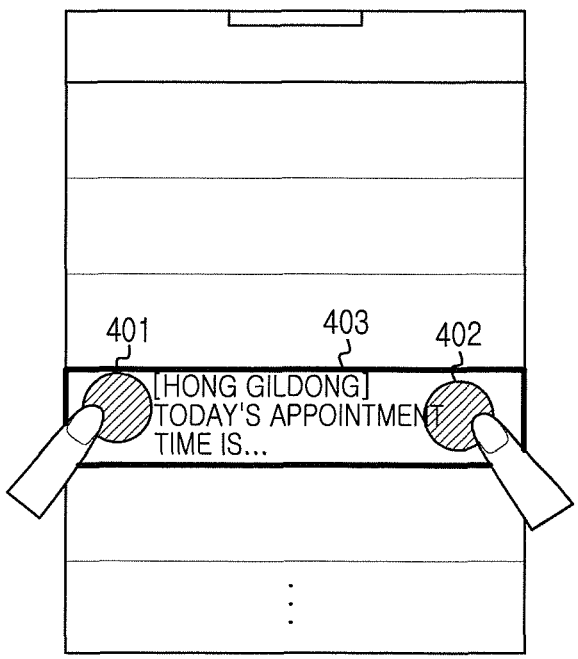 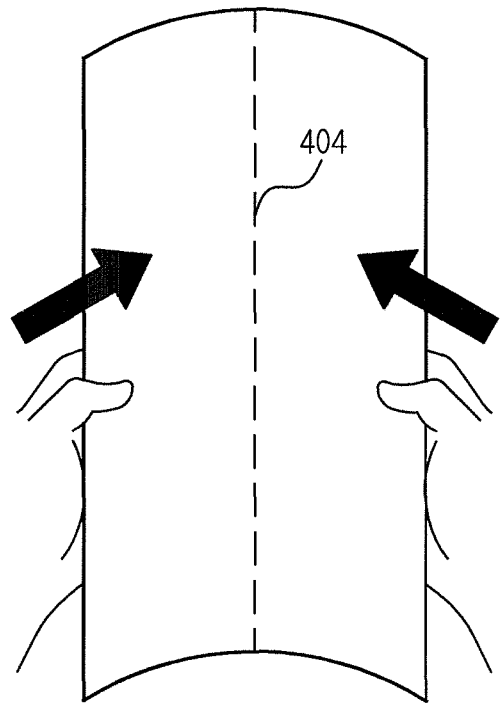
FIG.4A  FIG.4B
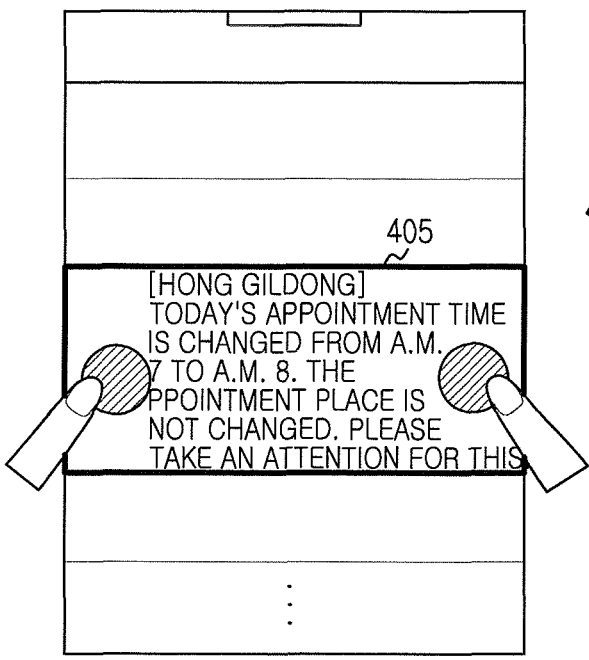 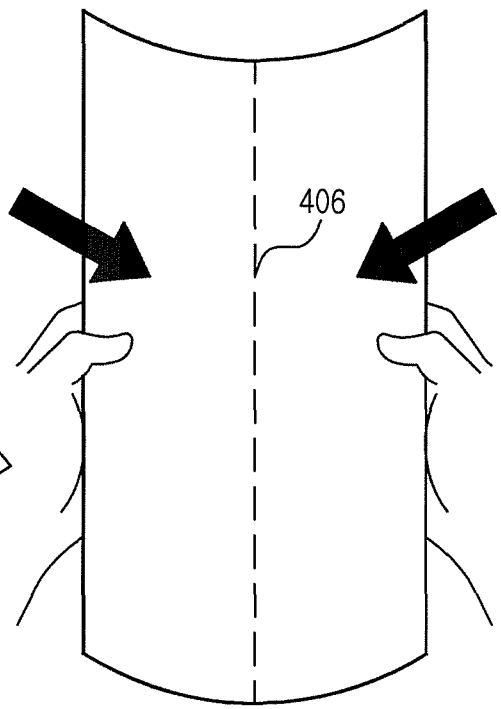
FIG.4C  FIG.4D

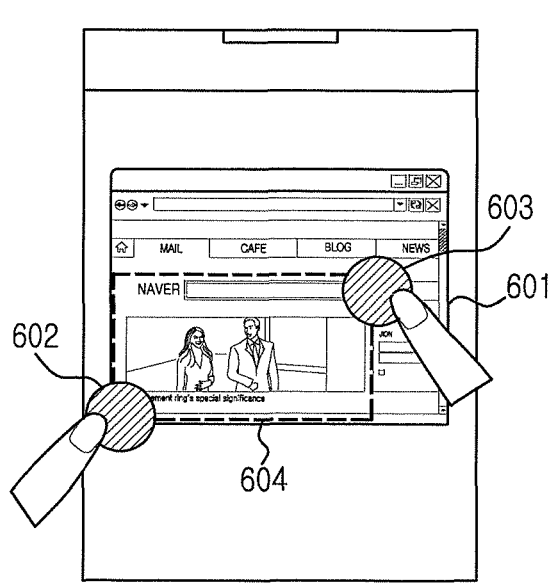 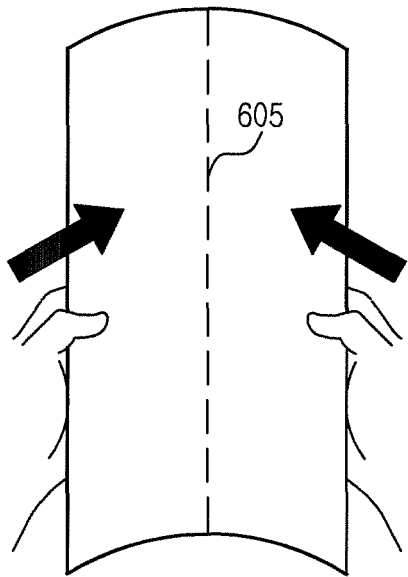
FIG.6A  FIG.6B
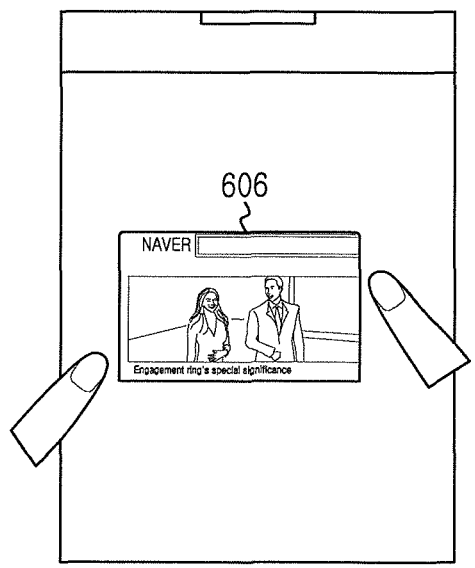 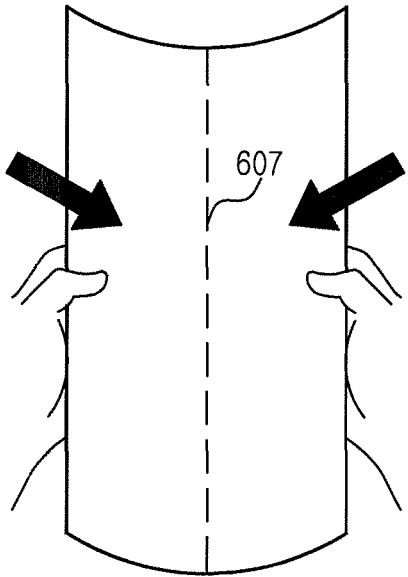
FIG.6C  FIG.6D

ELECTRONIC DEVICE AND METHOD FOR CHANGING AN OBJECT ACCORDING TO A BENDING STATE

CROSS-REFERENCE TO RELATED APPLICATION(S) AND CLAIM OF PRIORITY

The present application is related to and claims priority under 35 U.S.C. §119 to an application filed in the Korean Intellectual Property Office on Aug. 20, 2012 and assigned Serial No. 10-2012-0090815, the contents of which are incorporated herein by reference.

TECHNICAL FIELD

The present disclosure relates to a method of changing an object and an electronic device thereof.

BACKGROUND

With the development of functions for electronic devices, the electronic devices have developed from electronic devices having a simple flat shape into electronic devices deformable to be bent, thereby satisfying a users' diversified tastes. For example, a user may deform the electronic device to wrap around the user's wrist and wear the electronic device on the wrist, which is impossible for electronic devices having a flat shape.

However, the user interface of a flexible electronic device has not provided a user with much convenience in reality. Specifically, there has not been proposed a method for decreasing interactions with a user by detecting the bending state of an electronic device. For example, there has not been proposed a method for enabling a user to check content included in a list displayed on the touchscreen of an electronic device when the user deforms the electronic device to be bent.

Therefore, there is a need for an electronic device capable of providing necessary functions when a user deforms the electronic device to be bent without any additional interaction from the user.

SUMMARY

To address the above-discussed deficiencies, embodiments of the present disclosure include a device and method for controlling the layout of at least one object located in a set area according to bending states.

Certain embodiments of the present disclosure include a device and method for analyzing the coordinates of touch areas and setting an arbitrary area.

Certain embodiments of the present disclosure include a device and method for enabling the layout of an object located in a set area to be changed according to a positive bending state and a negative bending state.

Certain embodiments of the present disclosure include a method for operating an electronic device for changing and displaying an object according to a bending state, includes: analyzing coordinates of touch areas to set an arbitrary area; checking that at least one object is included in the set area; and controlling a layout of the at least one object included in the set area according to a bending state.

Analyzing coordinates of touch areas to set an arbitrary area includes: checking central coordinates of a first touch area and second touch area; generating four coordinates using the central coordinates of the first touch area and the central coordinates of the second touch area; and setting the arbitrary area by connecting the generated four coordinates.

Generating four coordinates using the central coordinates of the first touch area and the central coordinates of the second touch area includes: generating first coordinates composed of an x-coordinate of the central coordinates of the first touch area and a y-coordinate of the central coordinates of the second touch area; generating second coordinates composed of the central coordinates of the second touch area; generating third coordinates composed of the central coordinates of the first touch area; and generating fourth coordinates composed of an x-coordinate of the central coordinates of the second touch area and a y-coordinate of the central coordinates of the first touch area.

The object can include at least one of a list, an image and a pop-up window. The method further includes selecting the at least one object included in the set area.

The bending state can include a positive bending state in which a set portion between the first touch area and the second touch area is convexly bent frontward.

The bending state can include a negative bending state in which a set portion between the first touch area and the second touch area is concavely bent backward.

Controlling a layout of the at least one object included in the set area according to a bending state includes: checking that the electronic device is in a positive bending state in which a set portion between a first touch area and a second touch area is convexly bent frontward; and converting at least one list included in the set area into a text form and displaying a relevant text.

The method further includes checking that the electronic device is in a negative bending state in which the set portion between the first touch area and the second touch area is concavely bent backward; and converting at least one displayed text into a list form and displaying a relevant list.

Controlling a layout of the at least one object included in the set area according to a bending state includes: checking that the electronic device is in a positive bending state in which a set portion between a first touch area and a second touch area is convexly bent frontward; and enlarging at least one image or pop-up window included in the set area to a predetermined size and displaying the enlarged image or pop-up window.

The method can further include checking that the electronic device is in a flat state in which the set portion, which had been convexly bent frontward, is flattened.

The method can further include checking that the electronic device is in the negative bending state in which the set portion between the first touch area and the second touch area is concavely bent backward; and reducing the image or pop-up window which is enlarged to the predetermined size and displayed to a size prior to enlargement and displaying the reduced image or pop-up window.

The method can further include checking that the electronic device is in a flat state in which the set portion, which had been concavely bent backward, is flattened.

Certain embodiments of the present disclosure include an electronic device that includes: a processor unit for analyzing coordinates of touch areas to set an arbitrary area, checking that at least one object is included in the set area, and controlling a layout of the at least one object included in the set area according to a bending state; and a memory for storing signals controlled by the processor unit.

The processor unit checks central coordinates of a first touch area and a second touch area, generates four coordinates using the central coordinates of the first touch area and the central coordinates of the second touch area, and sets the arbitrary area by connecting the generated four coordinates.

The processor unit generates first coordinates composed of an x-coordinate of the central coordinates of the first touch area and a y-coordinate of the central coordinates of the second touch area, second coordinates composed of the central coordinates of the second touch area, third coordinates composed of the central coordinates of the touch area, and fourth coordinates composed of an x-coordinate of the central coordinates of the second touch area and a y-coordinate of the central coordinates of the first touch area.

The object can include at least one of a list, an image and a pop-up window.

The processor unit selects the at least one object included in the set area.

The bending state can include a positive bending state in which a set portion between a first touch area and a second touch area is convexly bent frontward.

The bending state can include a negative bending state in which a set portion between a first touch area and a second touch area is concavely bent backward.

The processor unit checks that the electronic device is in a positive bending state in which a set portion between a first touch area and a second touch area is convexly bent frontward. The electronic device further includes a touchscreen for converting at least one list included in the set area into a text form and displaying a relevant text.

The processor unit checks that the electronic device is in a negative bending state in which the set portion between the first touch area and the second touch area is concavely bent backward. The touch screen converts at least one displayed text into a list form and display a relevant list.

The processor unit checks that the electronic device is in a positive bending state in which a set portion between a first touch area and a second touch area is convexly bent frontward. The electronic device further includes a touchscreen for enlarging at least one image or pop-up window included in the set area to a predetermined size and displaying the enlarged image or pop-up window.

The processor unit checks that the electronic device is in a flat state in which the set portion, which had been convexly bent frontward, is flattened.

The processor unit checks that the electronic device is in a negative bending state in which the set portion between the first touch area and the second touch area is concavely bent backward. The touch screen reduces the image or pop-up window which is enlarged to the predetermined size and displayed to a size prior to enlargement and display the reduced image or pop-up window.

The processor unit checks that the electronic device is in a flat state in which the set portion, which had been concavely bent backward, is flattened.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A to 3C illustrate an embodiment for receiving selection of at least one list among a plurality of displayed lists according to embodiments of the present disclosure;

FIGS. 4A to 4D are illustrate an embodiment of changing and displaying an object according to bending states according to embodiments of the present disclosure;

FIGS. 6A to 6D illustrate an embodiment of changing and displaying an object according to bending states according to embodiments of the present disclosure;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Embodiments of the present disclosure will be described herein below with reference to the accompanying drawings. In the following description, detailed descriptions of well-known functions or configurations will be omitted to avoid unnecessarily obscuring the subject matters of the present disclosure. Also, the terms used herein are defined according to the functions of the present invention. Thus, the terms may vary depending on users' or operators' intentions or practices. Therefore, the terms used herein should be understood based on the descriptions made herein.

Figure 1:
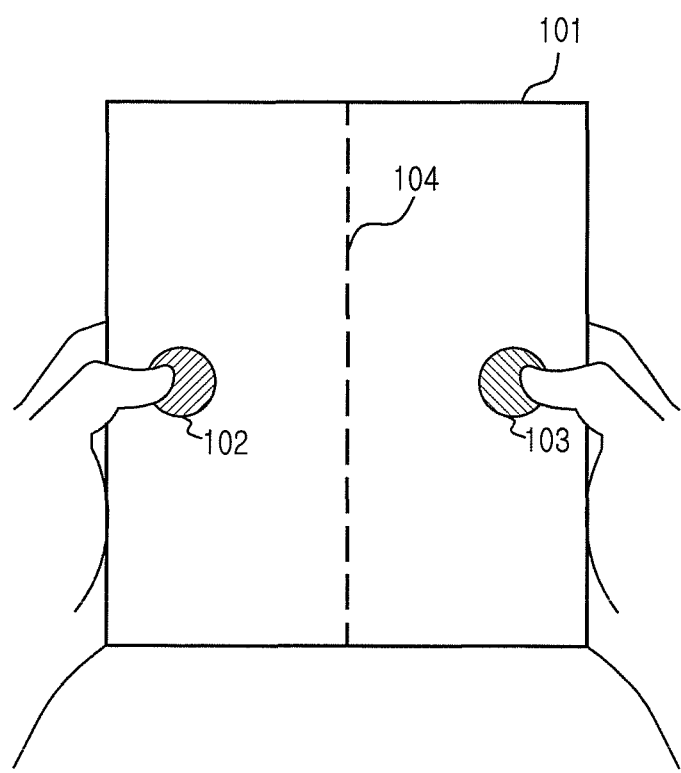
FIG. 1 illustrates an electronic device for changing and displaying an object according to a bending state according to embodiments of the present disclosure.

FIG. 1 illustrates an electronic device for changing and displaying an object according to a bending state according to embodiments of the present disclosure. Referring to FIG. 1, the electronic device 101 according to the present disclosure analyzes the coordinates of touch areas 102 and 103 touched by a user and sets an arbitrary area. Specifically, the electronic device 101 checks the central coordinates of a first touch area 102 and a second touch area 103 touched by the user, generates four coordinates using the central coordinates of the first touch area 102 and the central coordinates of the second touch area 103, and sets the arbitrary area by connecting the generated four coordinates. In the four coordinates, first coordinates can be composed of the x-coordinate of the central coordinates of the first touch area and the y-coordinate of the central coordinates of the second touch area, and second coordinates can be composed of the central coordinates of the second touch area. In addition, third coordinates can be composed of the central coordinates of the first touch area, and fourth coordinates may be composed of the x-coordinate of the central coordinates of the second touch area and the y-coordinate of the central coordinates of the first touch area. For example, it is assumed that the central coordinates of the first touch area 102 is (x1, y1), and the central coordinates of the second touch area 103 is (x2, y2). In the assumption, the first coordinates are composed of the x-coordinate of the central coordinates of the first touch area 102 and the y-coordinate of the central coordinates of the second touch area 103, hence, coordinates (x1, y2) are generated. The second coordinates are composed of the central coordinates of the second touch area 103, hence, coordinates (x2, y2) is generated. In addition, the third coordinates are composed of the central coordinates of the first touch area 102, hence, coordinates (x1, y1) are generated. The fourth coordinates are composed of the x-coordinate of the central coordinates of the second touch area 103 and the y-coordinate of the central coordinates of the first touch area 102, hence, coordinates (x2, y1) are generated.

After having analyzed the coordinates of the touch areas 102 and 103, and generated the arbitrary area, the electronic device 101 checks that at least one object is included within the set area. Specifically, the electronic device 101 receives a first touch input and a second touch input from the user, generates the arbitrary area, and checks that at least one object is included within the generated arbitrary area. In certain embodiments, the object is defined to include at least one of a list, an image and a pop-up window. That is, the user may select an object which the user wants to select from among one or more objects displayed on the electronic device through touch inputs.

In another flexible electronic device, an object intended for selection can not be selected by the touch inputs of the user. Specifically, in that other flexible electronic device, when the user attempts to select an object displayed on a touchscreen, the user has to make a separate behavior besides the touch inputs of the user, so that there is a problem that the number of interactions increases. However, in the electronic device 101 according to the present disclosure, an object intended to select by the user can be selected only through touch inputs, thereby requiring no separate interaction.

When checking that at least one object is included within the set area, the electronic device 101 controls the layout of the at least one object included in the set area according to the bending state of the electronic device. Specifically, the electronic device 101 controls the layout of the at least one object included in the set area depending on whether a positive bending or negative bending state is detected. In certain embodiments, the positive bending state is defined as a state in which a set portion 104 between the first touch area and the second touch area is convexly bent frontward. In addition, the negative bending state is defined as a state in which the set portion 104 between the first touch area and the second touch area is concavely bent backward. For example, when it is assumed that the set portion 104 is the central vertical of the electronic device, the positive bending state can be defined as a state in which the central vertical axis is convexly bent frontward, and the negative bending state can be defined a state in which the central vertical axis is concavely bent backward. That is, the electronic device 101 is a flexible electronic device, the set portion 104 of which can be convexly bent frontward or concavely bent backward. Cases in which the layout is controlled according to the kinds of objects included in the set area of the electronic device will be described in detail below.

First, it is assumed that one list is included in the set area of the electronic device 101, and the electronic device detects the positive bending state. In the above-described example, the electronic device 101 checks that the electronic device is in the positive bending state in which the set portion between the first touch area and the second touch area is convexly bent frontward; converts the one list included in the set area into a text form; and displays the same. Specifically, the electronic device 101 checks that the electronic device is in the positive bending state; converts all content of the list included in the set area into a text form; and displays the same. In this case, it is assumed that the above-described list is the simple content of a text message, and a text is the detailed content of the text message. That is, the transmitter, reception time and a part of detailed content of the text message are only displayed in the list. In the above-described assumption, when checking that the electronic device 101 is in the positive bending state, the electronic device converts the list into a text including the all detailed content of the text message and displays the same. Therefore, if the user selects the list of the text message which the user wants to check through a touch input, and deforms the electronic device 101 such that the set portion of the electronic device is convexly bent frontward, the user may check the detailed content of the selected text message. Specifically, as a result of being in the positive bending state, the set portion has been convexly bent frontward, and the user is uncomfortable to read a displayed text. As a result, it is preferable that the user deforms the electronic device to be in a flat state prior to the positive bending state such that the set portion, which had been convexly bent frontward, is to be flattened, and checks the text.

After checking the detailed text content, the user may deform the electronic device 101 from the flat state to the negative bending state to again covert the text displayed on the electronic device into a list form. That is, the electronic device 101 checks that the electronic device is in the negative bending state in which the set portion between the first touch area and the second touch area is concavely bent backward, and again converts the displayed text into the list form to display the same. In the above-described example, the electronic device 101 checks that the electronic device is in the negative bending state; and converts the displayed text message having the text form into the list form to display the same. As a result, after the user has checked the detailed text message, the user merely deforms the electronic device such that the set portion of the electronic device is concavely bent backward without a separate interaction, resulting in return to the previous list again. Specifically, the set portion is concavely bent backward in the negative bending state, hence, the user is uncomfortable to read the displayed list. As a result, it is preferable that the user deforms the electronic device to be in the flat state prior to the negative bending state such that the set portion, which had been convexly bent frontward, is to be flattened, and checks the list.

Thereafter, it is assumed that one image is included in the set area of the electronic device 101, and the electronic device detects the positive bending state. In the above-described example, the electronic device 101 checks that the electronic device is in the positive bending state in which the set portion between the first touch area and the second touch area is convexly bent frontward; enlarges the one image included in the set area to a predetermined size; and displays the same. Specifically, the electronic device 101 checks that the electronic device is in the positive bending state; enlarges the image included in the set area to the predetermined size; and displays the same. That is, when it is determined that there is a need for enlargement of the image, such as when the image is displayed in a small size, which is difficult to see for the user, and when the user wants to enlarge and see a specific portion of the image, and so on, the user deforms the electronic device 101 such that the set portion of the electronic device is convexly bent, thereby seeing the enlarged image. Specifically, since the set portion is convexly bent frontward in the positive bending state, the user is uncomfortable to see the enlarged image. As a result, it is preferable that the user deforms the electronic device 101 to be in the flat state prior to the positive bending state such that the set portion, which had been convexly bent frontward, is to be flattened, and sees the enlarged image.

When seeing the enlarged image, the user deforms the electronic device from the flat state to the negative bending state, thereby reducing the enlarged image displayed on the electronic device to the size prior to the enlargement and again displaying the reduced image. That is, when checking that the electronic device 101 is in the negative bending state in which the set portion between the first touch area and the second touch area is concavely bent backward, the electronic device 101 reduces the enlarged image displayed on the electronic device to the size prior to the enlargement and displays the reduced image. As a result, after the user has seen the enlarged image, the user merely deforms the electronic device 101 such that the set portion of the electronic device to be concavely bent backward without a separate interaction, resulting in return to the image prior to the enlargement. Specifically, since the set portion is concavely bent backward in the negative bending state, the user is uncomfortable to see the reduced and displayed image. As a result, it is preferable that the user deforms the electronic device to be in the flat state prior to the negative bending state such that the set portion, which had been convexly bent frontward, is to be flattened, and see the image.

Next, it is assumed that one pop-up window is included in the set area of the electronic device 101, and the electronic device detects the positive bending state. In certain embodiments, the pop-up window is defined as a window in which a browser, an e-book reader, various applications or the like is displayed on the electronic device in a pop-up form. In the above-described example, the electronic device 101 checks that the electronic device is in the positive bending state in which the set portion between the first touch area and the second touch area is convexly bent frontward; enlarges the one pop-up window included in the set area to a predetermined sizes and displays the enlarged pop-up window. Specifically, the electronic device 101 checks that the electronic device is in the positive bending state; enlarges the pop-up window included in the set area to the predetermined size; and displays the enlarged pop-up window. That is, when it is determined that there is a need for enlargement of the pop-up window, such as when the pop-up window has been displayed in a small size, which is difficult to see for the user and so on, the user deforms the electronic device 101 such that the set portion of the electronic device is convexly bent, thereby checking the enlarged pop-up window. Specifically, the set portion convexly bent frontward in the positive bending state, causes the user discomfort in being able to see the enlarged pop-up window. As a result, it is preferable that the user deforms the electronic device 101 to be in a flat state prior to the positive bending state such that the set portion, which had been convexly bent frontward, is to be flattened, and sees the enlarged pop-up window.

When seeing the enlarged pop-up window, the user deforms the electronic device 101 from the flat state to the negative bending state to reduce the enlarged pop-up window displayed on the electronic device to the size prior to the enlargement and to again display the reduced pop-up window. That is, when checking that the electronic device 101 is in the negative bending state in which the set portion between the first touch area 102 and the second touch area 103 is concavely bent backward, the electronic device 1010 reduces the enlarged pop-up window displayed on the electronic device to the size prior to the enlargement and displays the reduced image. As a result, after the user has seen the enlarged pop-up window, the user merely deforms the electronic device 101 such that the set portion of the electronic device is concavely bent backward without a separate interaction, resulting in a return to the pop-up window prior to the enlargement. Specifically, when the set portion is concavely bent backward in the negative bending state, the user is uncomfortable to see the reduced and displayed pop-up window. As a result, it is preferable that the user deforms the electronic device 101 to be in the flat state prior to the negative bending state such that the set portion, which had been convexly bent frontward, is to be flattened, and sees the pop-up window.

Figure 2A:
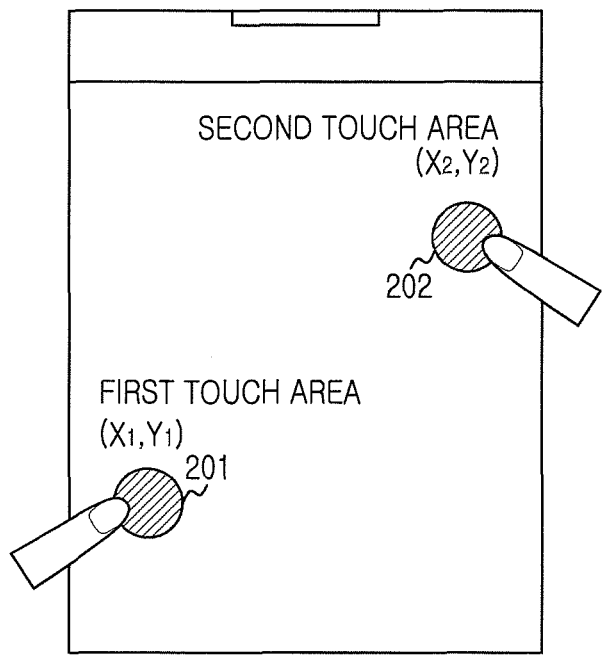
FIGS. 2A and 2B illustrate an embodiment for analyzing the coordinates of touch areas and setting an arbitrary area according to embodiments of the present disclosure.
Figure 2B:
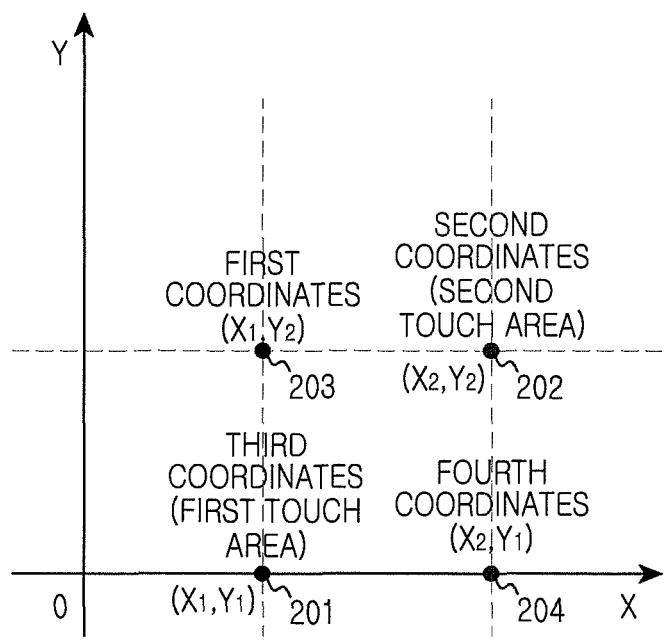

FIGS. 2A and 2B illustrate an embodiment for analyzing the coordinates of touch areas and setting an arbitrary area according to embodiments of the present disclosure. FIG. 2A illustrates an embodiment for analyzing the coordinates of touch areas according to embodiments of the present disclosure. As shown in FIG. 2A, the electronic device according to the present disclosure is a flexible electronic device, the set portion of which can be convexly bent frontward or concavely bent backward. Specifically, when the user holds the electronic device with both hands and applies force to the both sides thereof backward, the electronic device can be in the positive bending state in which the set portion of the electronic device is convexly bent frontward. In addition, when the user holds the electronic device with both hands and applies force to the both sides thereof frontward, the electronic device can be in the negative bending state in which the set portion of the electronic device is concavely bent backward. That is, the user deforms the electronic device to be in the positive bending state or in the negative bending state, thereby controlling the layout of the at least one object included in the set area. An embodiment of analyzing the coordinates of touch areas in the electronic device will be described in detail below.

The electronic device receives touch inputs on two areas 201 and 202 from the user. Specifically, the electronic device receives a first touch input and a second touch input by the two thumbs of the user. Of course, the electronic device can receive the first touch input and the second touch input by other fingers than the thumbs of the user. However, the user may be most comfortable to hold the lower portions of the electronic device using the remaining four fingers with the thumbs touched on the touchscreen of the electronic device. Thereafter, the electronic device analyzes the coordinates of the two touch areas 201 and 202 when receiving the touch inputs from the user. Specifically, the electronic device checks the central coordinates of the respective touch areas 201 and 202 touched by the user. As in the example illustrated in FIG. 2A, the electronic device receives the touch inputs on the first touch area 201 and the second touch area 202. The electronic device checks that the central coordinates of the first touch area are (x1, y1), and the central coordinates of the second touch area are (x2, y2).

FIG. 2B illustrates an embodiment for setting an arbitrary area by generating four coordinates according to embodiments of the present disclosure. First, the electronic device analyzes the coordinates of the touch areas touched by the user, and generates four coordinates 201 through 204 in order to set an arbitrary area. Specifically, the electronic device checks the central coordinates of the first touch area 201 and the second touch area 202 which are touched by the user, generates four coordinates 201 through 204 using the central coordinates of the first touch area 201 and the central coordinates of the second touch area 202, and sets the arbitrary area, by connecting the generated four coordinates 201 through 204.

For the four coordinates, the first coordinates 203 are composed of the x-coordinate of the central coordinates of the first touch area 201 and the y-coordinate of the central coordinates of the second touch area 202; second coordinates 202 are composed of the central coordinates of the second touch area; third coordinates 201 are composed of the central coordinates of the touch area, and fourth coordinates 204 are composed of the x-coordinate of the central coordinates of the second touch area and the y-coordinate of the central coordinates of the first touch area. For example, it is assumed that the central coordinates of the first touch area 201 is (x1, y1), and the central coordinates of the second touch area 202 is (x2, y2). In the assumption, since the first coordinates 203 are composed of the x-coordinate of the central coordinates of the first touch area 201 and the y-coordinate of the central coordinates of the second touch area 202, coordinates (x1, y2) are generated. The second coordinates 202 are composed of the central coordinates of the second touch area 202, hence, coordinates (x2, y2) are generated. In addition, the third coordinates 201 are composed of the central coordinates of the first touch area 201, hence coordinates (x1, y1) are generated. The fourth coordinates 204 are composed of the x-coordinate of the central coordinates of the second touch area 202 and the y-coordinate of the central coordinates of the first touch area 201, coordinates (x2, y1) are generated. That is, the electronic device receives the touch inputs from the user; and generates the four coordinates 201 through 204 by using the central coordinates of the first touch area 201 and the second touch area 202 in order to set the arbitrary area.

FIGS. 3A to 3C illustrate an embodiment of receiving selection of at least one list among a plurality of displayed lists according to embodiments of the present disclosure. FIG. 3A illustrates an embodiment of receiving selection of at least one list among the plurality of displayed lists according to the present disclosure. First, as illustrated in FIG. 3A, it is assumed that a plurality of text messages listed is displayed on the touchscreen of the electronic device. In this case, the above-described text message list represents a list including the brief content of a text message. In the text message list, the transmitter, reception time and a part of detailed content of the text message may be only displayed. According to other electronic devices, in order to check the detailed content of a text message, the user needs to separately select a text message list to be checked. However, the electronic device according to the present disclosure checks the central coordinates of touch areas touched by the user and sets an arbitrary area without a separate interaction. Thereafter, the electronic device checks that the electronic device is in the positive bending state, and displays a detailed text message in a text form. An embodiment of receiving selection of the arbitrary area in the electronic device will be described in detail below.

Referring to FIG. 3A, the electronic device may display a plurality of text message lists. Thereafter, when receiving touches on two areas 301 and 302 from the user, the electronic device analyzes the coordinates of the touch areas 301 and 302, and sets an arbitrary area. Specifically, the electronic device checks the central coordinates of the first touch area 301 and the second touch area 302, which are touched by the user, generates four coordinates using the central coordinates of the first touch area 301 and the central coordinates of the second touch area 302, and sets an arbitrary area by connecting the generated four coordinates. In the four coordinates, first coordinates are composed of the x-coordinate of the central coordinates of the first touch area and the y-coordinate of the central coordinates of the second touch area; and second coordinates are composed of the central coordinates of the second touch area. In addition, third coordinates are composed of the central coordinates of the first touch area, and fourth coordinates are composed of the x coordinate of the central coordinates of the second touch area and the y-coordinate of the central coordinates of the first touch area. For example, it is assumed that the central coordinates of the first touch area 301 is (x1, y1), and the central coordinates of the second touch area 302 is (x2, y2). In the assumption, since the first coordinates are composed of the x-coordinate of the central coordinates of the first touch area 301 and the y coordinate of the central coordinates of the second touch area 302, coordinates (x1, y2) are generated. Since the second coordinates are composed of the central coordinates of the second touch area 302, coordinates (x2, y2) are generated. In addition, since the third coordinates are composed of the central coordinates of the first touch area 301, coordinates (x1, y1) are generated, and, since the fourth coordinates are composed of the x-coordinate of the central coordinates of the second touch area and the y-coordinate of the central coordinates of the first touch area, coordinates (x2, y1) are generated.

As describe above, the electronic device sets the arbitrary area by connecting the generated first coordinates to fourth coordinates. That is, the electronic device of FIGS. 3A, 3B, and 3C checks that one text message list is included in an area 303 set by connecting the first coordinates to the fourth coordinates. Of cause, when the central coordinates of the first touch area 301 are identical to the central coordinates of the second touch area 302, the electronic device checks that the first coordinates are identical to the third coordinates and the second coordinates are identical to the fourth coordinates in the generated four coordinates, and, thereafter, set the arbitrary area by connecting only the central coordinates of the two touch areas 301 and 302.

FIG. 3B illustrates an embodiment of receiving selection of two listed items among a plurality of displayed items according to embodiments of the present disclosure. First, as illustrated in FIG. 3B, it is assumed that a list of a plurality of text messages is displayed on the touchscreen of the electronic device.

Thereafter, when receiving touches on two areas 304 and 305 from the user, the electronic device analyzes the coordinates of the touch areas 304 and 305, and sets an arbitrary area. Specifically, the electronic device checks the central coordinates of the first touch area 304 and the second touch area 305, which are touched by the user. The electronic device generates four coordinates using the central coordinates of the first touch area 304 and the central coordinates of the second touch area 305, and sets an arbitrary area by connecting the generated four coordinates. In the four coordinates, the first coordinates are composed of the x-coordinate of the central coordinates of the first touch area 304 and the y-coordinate of the central coordinates of the second touch area, and second coordinates are composed of the central coordinates of the second touch area. In addition, third coordinates are composed of the central coordinates of the first touch area, and fourth coordinates are composed of the x-coordinate of the central coordinates of the second touch area 305 and the y-coordinate of the central coordinates of the first touch area 304.

For example, it is assumed that the central coordinates of the first touch area 304 is (x1, y1), and the central coordinates of the second touch area 305 is (x2, y2). In the assumption, since the first coordinates are composed of the x-coordinate of the central coordinates of the first touch area 304 and the y-coordinate of the central coordinates of the second touch area 305, coordinates (x1, y2) are generated. Since the second coordinates are composed of the central coordinates of the second touch area, coordinates (x2, y2) are generated. In addition, since the third coordinates are composed of the central coordinates of the first touch area, coordinates (x1, y1) are generated, and, since the fourth coordinates are composed of the x-coordinate of the central coordinates of the second touch area 305 and the y-coordinate of the central coordinates of the first touch area 304, coordinates (x2, y1) are generated. As describe above, the electronic device sets the arbitrary area by connecting the generated first coordinates to fourth coordinates. That is, the electronic device according to the present disclosure checks that the two text messages list is included in an area 306 set by connecting the first coordinates to the fourth coordinates.

FIG. 3C illustrates an embodiment of receiving selection of four lists among a plurality of displayed lists according to embodiments of the present disclosure. First, referring to FIG. 3C, it is assumed that a plurality of text messages in a list is displayed on the touchscreen of the electronic device. Thereafter, when receiving touches on two areas 307 and 308 from the user, the electronic device analyzes the coordinates of the touch areas 307 and 308, and sets an arbitrary area. Specifically, the electronic device checks the central coordinates of the first touch area 307 and the second touch area 308, which are touched by the user; generates four coordinates using the central coordinates of the first touch area 307 and the central coordinates of the second touch area 308; and sets the arbitrary area by connecting the generated four coordinates.

In the four coordinates, first coordinates are composed of the x-coordinate of the central coordinates of the first touch area 307 and the y-coordinate of the central coordinates of the second touch area, and second coordinates are composed of the central coordinates of the second touch area 308. In addition, third coordinates are composed of the central coordinates of the first touch area 307, and fourth coordinates are composed of the x-coordinate of the central coordinates of the second touch area 308 and the y-coordinate of the central coordinates of the first touch area 307. For example, it is assumed that the central coordinates of the first touch area 307 is (x1, y1), and the central coordinates of the second touch area 308 is (x2, y2). In the assumption, since the first coordinates are composed of the x-coordinate of the central coordinates of the first touch area 307 and the y-coordinate of the central coordinates of the second touch area 308, coordinates (x1, y2) are generated. Since the second coordinates are composed of the central coordinates of the second touch area 308, coordinates (x2, y2) are generated. In addition, since the third coordinates are composed of the central coordinates of the first touch area 307, coordinates (x1, y1) are generated, and, since the fourth coordinates are composed of the x-coordinate of the central coordinates of the second touch area 308 and the y-coordinate of the central coordinates of the first touch area 307, coordinates (x2, y1) are generated. As describe above, the electronic device sets the arbitrary area by connecting the generated first coordinates to fourth coordinates.

That is, the electronic device according to the present embodiment checks that the four text message lists are included in an area 309 set by connecting the first coordinates to the fourth coordinates. In addition, when the checking that one touch area of the two touch areas touched by the user is an indicator area 310, the electronic device receives selection of even a text message list which is not displayed currently on the touchscreen. The present embodiment has described by taking a text message list as an example, but it is apparent that the present disclosure is applicable to other cases in which a list, such as an email list, a memo and a calendar or the like is used.

FIGS. 4A to 4D illustrate an embodiment of changing and displaying an object according to bending states according to embodiments of the present disclosure. FIG. 4A illustrates an embodiment of receiving selection of any one list among a plurality of displayed lists according to the present disclosure. As illustrated in FIG. 4A, the electronic device displays a list of a plurality of text messages. Thereafter, when receiving touches on two areas 401 and 402 from the user, the electronic device analyzes the coordinates of the touch areas 401 and 402, and sets an arbitrary area. Specifically, the electronic device checks the central coordinates of the first touch area 401 and the second touch area 402, which are touched by the user; generates four coordinates using the central coordinates of the first touch area 401 and the central coordinates of the second touch area 402; and sets the arbitrary area by connecting the generated four coordinates. In the four coordinates, first coordinates are composed of the x-coordinate of the central coordinates of the first touch area 401 and the y-coordinate of the central coordinates of the second touch area 402, and second coordinates are composed of the central coordinates of the second touch area. In addition, third coordinates are composed of the central coordinates of the first touch area 401, and fourth coordinates are composed of the x-coordinate of the central coordinates of the second touch area 402 and the y-coordinate of the central coordinates of the first touch area 401.

As described above, the electronic device sets the arbitrary area by connecting the generated first coordinates to fourth coordinates. That is, the electronic device according to FIGS. 4A-4D checks that one text message list is included in an area 403 set by connecting the first coordinates to the fourth coordinates. Of course, when the central coordinates of the first touch area 401 are identical to the central coordinates of the second touch area 402, the electronic device checks that the first coordinates are identical to the third coordinates and the second coordinates are identical to the fourth coordinates in the generated four coordinates, and, thereafter, set the arbitrary area by connecting only the central coordinates of the two touch areas 401 and 402.

FIG. 4B illustrates an embodiment of a positive bending state according to the present disclosure. When checking that one object is included within the set area, the electronic device controls the layout of the object included in the set area according to the bending state of the electronic device. Specifically, the electronic device controls the layout of at least one object included in the set area depending on whether a positive bending state or negative bending state is detected. In the above-described example, the electronic device checks that the electronic device is in the positive bending state in which the set portion 404 between the first touch area and the second touch area is convexly bent frontward, convert the one text message list included in the set area into a text form, and displays the same. Specifically, the electronic device checks that the electronic device is in the positive bending state; converts the all detailed content of the text message list included in the set area into a text form; and displays the same. That is, in the list, the transmitter, reception time and a part of detailed content of the text message are only displayed. When checking that the electronic device is in the positive bending state, the electronic device converts the text message list into a text form including the detailed content of the text message and displays the same. Therefore, the user selects the list of the text message which the user wants to check through a touch input, and then deforms the electronic device such that the set portion 404 of the electronic device is convexly bent frontward, thereby checking the detailed content of the selected text message. Specifically, since the set portion 404 is convexly bent frontward in the positive bending state, the user is uncomfortable to read a displayed text. As a result, it is preferable that the user deforms the electronic device to be in the flat state prior to the positive bending state such that the set portion 404, which had been convexly bent frontward, is to be flattened, and checks the text.

FIG. 4C illustrates an embodiment in which a detailed text message is displayed according embodiments of to the present disclosure. As illustrated in FIG. 4C, when checking the electronic device is in the positive bending state, the electronic device displays the detailed content 405 of a text message list included in a set arbitrary area. In another flexible electronic device, an object intended for selection can not be selected by the touch inputs of the user. Specifically, in that other flexible electronic device, when the user attempts to select an object displayed on a touchscreen, the user has to make a separate behavior besides the touch inputs of the user, so that there is a problem that the number of interactions increases. However, in the electronic device according to the present disclosure an object intended to select by the user can be selected only through touch inputs thereby requiring no separate interaction. Therefore, the user selects the list of the text message which the user wants to check through touch inputs and merely deforms the electronic device to be in the positive bending state, thereby checking the detailed content of the text message without a separate interaction.

FIG. 4D illustrates an embodiment of a negative bending state according to embodiments of the present disclosure. As illustrated in FIG. 4D, when checking the detailed content of a text message, the user deforms the electronic device from the flat state to the negative bending state thereby again converting the text message displayed on the electronic device into a list form. That is, the electronic device checks that the electronic device is in the negative bending state in which the set portion 406 between the first touch area and the second touch area is concavely bent backward; converts the displayed text message into the list form again, and display the same. In the above-described example, the electronic device checks that the electronic device is in the negative bending state, and converts the displayed text message into the list form again, and displays the same. As a result, after the user has checked the detailed text message, the user merely deforms the electronic device such that the set portion 406 of the electronic device is concavely bent backward without a separate interaction, resulting in return to the previous list again. Specifically, since the set portion 406 is concavely bent backward in the negative bending state, the user is uncomfortable to read the displayed list. As a result, it is preferable that the user deforms the electronic device to be in the flat state prior to the negative bending state such that the set portion, which had been concavely bent backward, is to be flattened, and checks the list.

Figures 5A, 5B:
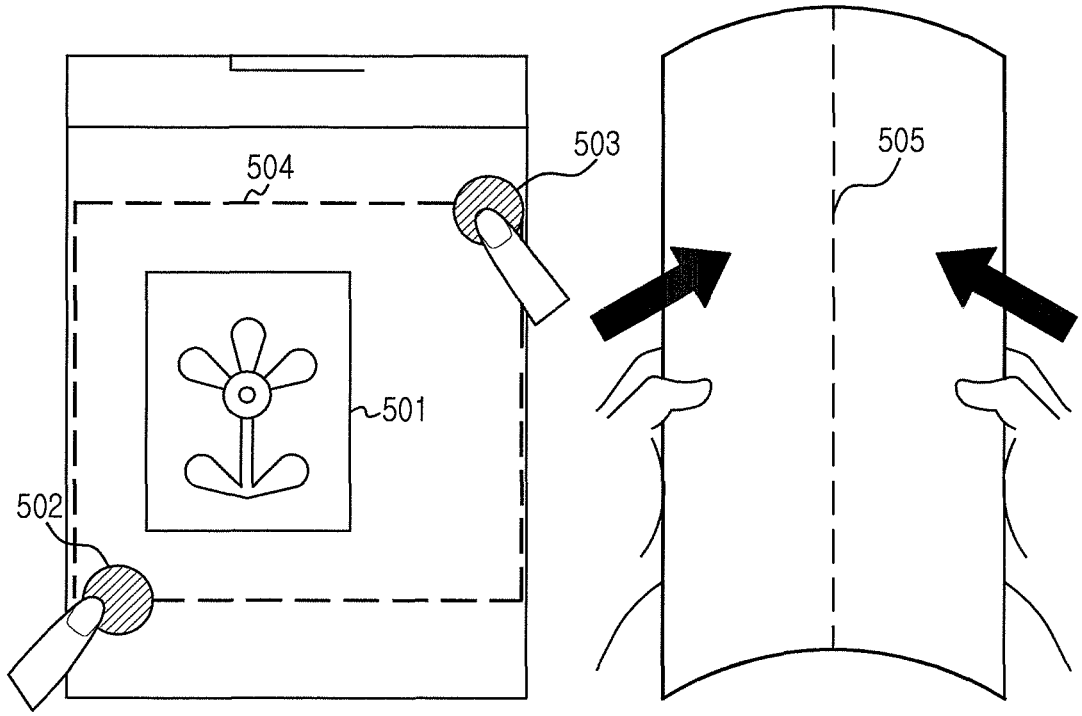
FIGS. 5A to 5D illustrate an embodiment of changing and displaying an object according to bending states according to embodiments of the present disclosure.

FIGS. 5A to 5D are diagrams illustrating another embodiment of changing and displaying an object according to bending states according to the present disclosure. FIG. 5A illustrates an embodiment of receiving selection of a displayed image according to embodiments of the present disclosure. As illustrated in FIG. 5A, the electronic device displays a webpage or background image 501. Thereafter, when receiving touches on two areas 502 and 503 from the user, the electronic device analyzes the coordinates of the touch areas 502 and 503, and set an arbitrary area 504. Specifically, the electronic device checks the central coordinates of the first touch area 502 and the second touch area 503, which are touched by the user; generates four coordinates using the central coordinates of the first touch area 502 and the central coordinates of the second touch area 503; and sets the arbitrary area 504 by connecting the generated four coordinates. In the four coordinates, first coordinates are composed of the x-coordinate of the central coordinates of the first touch area 502 and the y-coordinate of the central coordinates of the second touch area 503, and second coordinates are composed of the central coordinates of the second touch area. In addition, third coordinates are composed of the central coordinates of the first touch area 502, and fourth coordinates are composed of the x-coordinate of the central coordinates of the second touch area 503 and the y-coordinate of the central coordinates of the first touch area 502. As describe above, the electronic device sets the arbitrary area 504 by connecting the generated first coordinates to fourth coordinates. That is, the electronic device according to FIGS. 5A through 5D checks that one image 501 is included in the area 504 set by connecting the first coordinates to the fourth coordinates.

FIG. 5B illustrates an embodiment of a positive bending state according to embodiments of the present disclosure. When checking that an object is included within the set area, the electronic device controls the layout of the object included in the set area according to the bending state of the electronic device. Specifically, the electronic device controls the layout of the object included in the set area depending on whether the positive bending state or negative bending state is detected. In the above-described example, the electronic device checks that the electronic device is in the positive bending state in which the set portion 505 between the first touch area and the second touch area is convexly bent frontward, enlarge the one image included in the set area to a predetermined size, and display the same. Specifically, the electronic device checks that the electronic device is in the positive bending state; enlarges the image included in the set area to the predetermined size; and displays the same. That is, when it is determined that there is a need for enlargement of the image, such as when the image is displayed in a small size, which is difficult to see for the user, when the user wants to enlarge and see a specific portion of the image, and so on, the user deforms the electronic device such that the set portion 505 of the electronic device is convexly bent frontward, thereby seeing the enlarged image. Specifically, since the set portion 505 is convexly bent frontward in the positive bending state, the user is uncomfortable to see the enlarged image. As a result, it is preferable that the user deforms the electronic device to be in the flat state prior to the positive bending state such that the set portion 505, which had been convexly bent frontward, is to be flattened, and checks the enlarged image.

Figures 5C, 5D:
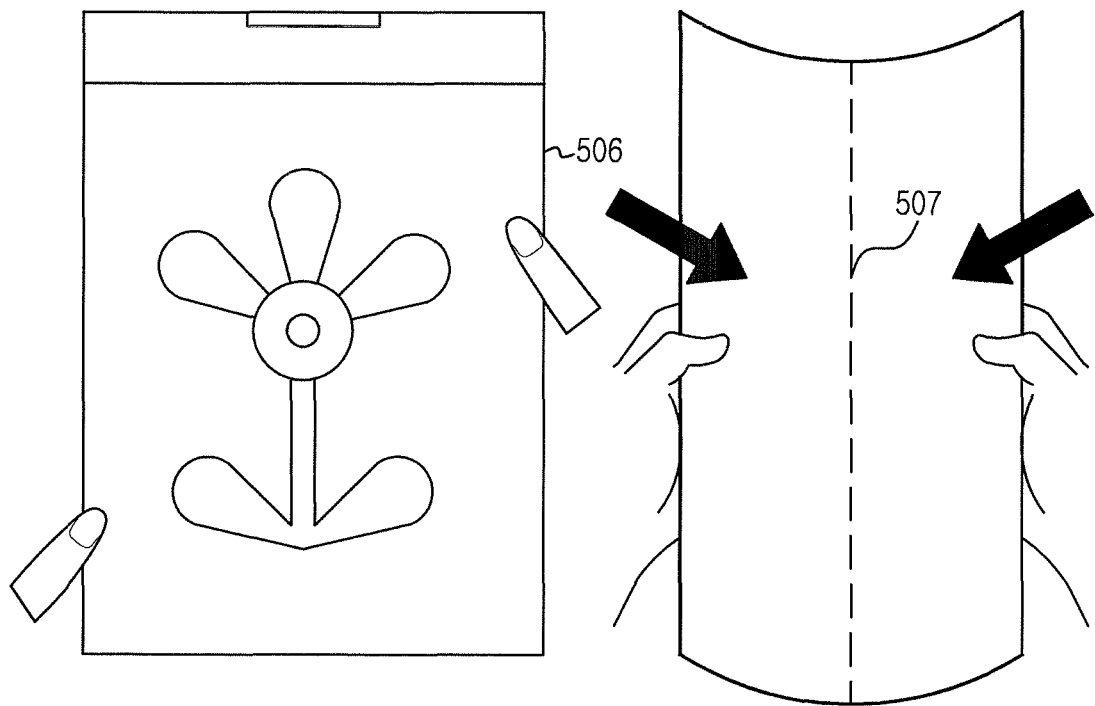

FIG. 5C illustrates an embodiment in which art image enlarged to a predetermined size is displayed according to embodiments of the present disclosure. As illustrated in FIG.

5C, when checking that the electronic device is in the positive bending state, the electronic device enlarges (as shown by the enlarged image 506) an image included in the set arbitrary area to the predetermined size and displays the same. In another flexible electronic device, an object intended for selection can not be selected by the touch inputs of the user. Specifically, in that other flexible electronic device, when the user attempts to select an object displayed on a touchscreen, the user has to make a separate behavior besides the touch inputs of the user, so that there is a problem that the number of interactions increases. However, in the electronic device of the present disclosure, an object intended to select by the user can be selected only through touch inputs, thereby requiring no separate interaction. Therefore, the user selects the image, which the user wants to enlarge and see, through touch inputs, and only deforms the electronic device to be in the positive bending state, thereby seeing the image enlarged to the predetermined size without a separate interaction.

FIG. 5D illustrates an embodiment of a negative bending state according to the present disclosure. As illustrated in FIG. 5D, when seeing the image enlarged to the predetermined size, the user deforms the electronic device from the flat state to the negative bending state, thereby converting the enlarged image displayed on the electronic device into the image having the size prior to the enlargement again. That is, the electronic device checks that the electronic device is in the negative bending state in which the set portion 507 between the first touch area and the second touch area is concavely bent backward; converts the enlarged image displayed on the electronic device into the image having the size prior to the enlargement again; and displays the same. As a result, after the user has seen the enlarged image, the user merely deforms the electronic device such that the set portion 507 of the electronic device is concavely bent backward without a separate interaction, resulting in return to the image having the previous size again. Specifically, since the set portion 507 is concavely bent backward in the negative bending state, the user is uncomfortable to see the reduced and displayed image. As a result, it is preferable that the user deforms the electronic device to be in the flat state prior to the negative bending state such that the set portion, which had been convexly bent frontward, is to be flattened, and see the image.

FIG. 6 illustrates an embodiment of changing and displaying an object according to a bending state according to the present disclosure. FIG. 6A illustrates an embodiment of receiving selection of a displayed pop-up window according to embodiments of the present disclosure. First, the electronic device displays a browser, an e-book reader, various applications or the like in a pop-up form. FIG. 6A illustrates an embodiment in which a web page 601 having a media player for playing sound sources or moving pictures is displayed. Thereafter, when receiving touches on two areas 602 and 603 from the user, the electronic device analyzes the coordinates of the touch areas 602 and 603, and set an arbitrary area 604. Specifically, the electronic device checks the central coordinates of the first touch area 602 and the second touch area 603, which are touched by the user; generates four coordinates using the central coordinates of the first touch area 602 and the central coordinates of the second touch area 603, and sets the arbitrary area 604 by connecting the generated four coordinates. In the four coordinates, first coordinates are composed of the x-coordinate of the central coordinates of the first touch area and the y-coordinate of the central coordinates of the second touch area, and second coordinates are composed of the central coordinates of the second touch area. In addition, third coordinates are composed of the central coordinates of the first touch area, and fourth coordinates are composed of the x-coordinate of the central coordinates of the second touch area and the y-coordinate of the central coordinates of the first touch area. As describe above, the electronic device sets the arbitrary area 604 by connecting the generated first coordinates to fourth coordinates.

FIG. 6B illustrates an embodiment of a positive bending state according to the present disclosure. When checking that an object is included within the set area, the electronic device controls the layout of the object included in the set area according to the bending state of the electronic device. Specifically, the electronic device controls the layout of the object included in the set area depending on whether a positive bending state or negative bending state is detected. In the above-described example, the electronic device checks that the electronic device is in the positive bending state in which the set portion 605 between the first touch area and the second touch area is convexly bent frontward; enlarges the media player included in the set area to a predetermined size; and displays the same. Specifically, the electronic device checks that the electronic device is in the positive bending state, enlarges the media player included in the set area to a predetermined area, and displays the same. That is, when the user wants to increase the size of the media player to the predetermined area because the media player is displayed in a small size, the user merely deforms the electronic device such that the set portion of the electronic device is convexly bent frontward, thereby displaying the media player enlarged to the predetermined area. Specifically, since the set portion 605 is convexly bent frontward in the positive bending state, the user is uncomfortable to see the media player enlarged to the predetermined area. As a result, it is preferable that the user deforms the electronic device to be in the flat state prior to the positive bending state such that the set portion 605, which had been convexly bent frontward, is to be flattened, and checks the media player.

FIG. 6C illustrates an embodiment in which a media player is enlarged to a predetermined size and displayed according to embodiments of the present disclosure. As illustrated in FIG. 6C, when checking the electronic device is in the positive bending state, the electronic device enlarges (as shown by the image 606) the media player included in the set arbitrary area to the predetermined area and displays the same. In another flexible electronic device, an object intended for selection can not be selected by the touch inputs of the user. Specifically, in ath other flexible electronic device, when the user attempts to select an object displayed on a touchscreen, the user has to make a separate behavior besides the touch inputs of the user, so that there is a problem that the number of interactions increases. However, in the electronic device according to the present disclosure, an object intended to select by the user can be selected only through touch inputs, thereby requiring no separate interaction. Therefore, when the user wants to enlarge a displayed media player through touch inputs, the user merely deforms the electronic device to be in the positive bending state, thereby seeing the media player enlarged to the predetermined size without a separate interaction.

FIG. 6D illustrates an embodiment of a negative bending state according to the present disclosure. As illustrated in FIG. 6D, when seeing the media player enlarged to the predetermined size, the user deforms the electronic device from the flat state to the negative bending state, thereby converting the enlarged media player displayed on the electronic device into the media player having the size prior to the enlargement again. That is, the electronic device checks that the electronic device is in the negative bending state in which the set portion 607 between the first touch area and the second touch area is concavely bent backward; converts the enlarged media player displayed into the media player having the size prior to the enlargement; and displays the same. As a result, after the user has seen the enlarged media player, the user merely deforms the electronic device such that the set portion 607 of the electronic device is concavely bent backward without a separate interaction, resulting in return to the media player having the previous size again. Specifically, since the set portion 607 has been concavely bent backward in the negative bending state, the user is uncomfortable to see the reduced and displayed media player. As a result, it is preferable that the user deforms the electronic device to be in the flat state prior to the negative bending state such that the set portion, which had been concavely bent backward, is to be flattened, and then checks the media player.

Figure 7:
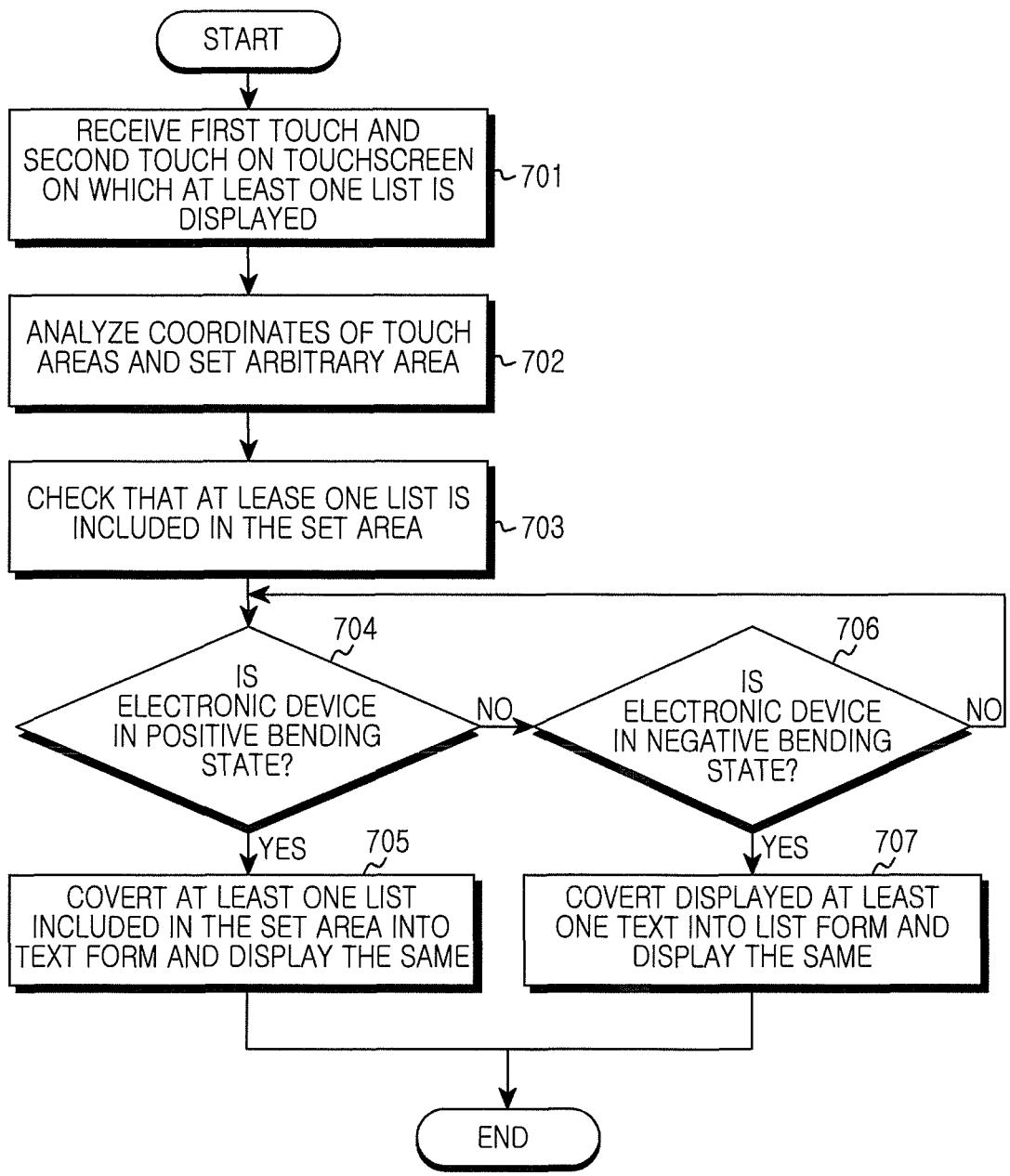
FIG. 7 illustrates a method for operating an electronic device according to embodiments of the present disclosure.

FIG. 7 illustrates a method for operating an electronic device according to embodiments of the present disclosure. As illustrated in FIG. 7, first, the electronic device receives a first touch and a second touch on a touchscreen on which at least one list is displayed (block 701). Specifically, the electronic device receives the first touch input and the second touch input by the two thumbs of a user. Of course, the electronic device can receive the first touch input and the second touch input by other fingers of the user. However, the user is most comfortable to hold the lower portions of the electronic device using the remaining four fingers with the thumbs touched on the touchscreen of the electronic device.

When receiving the first touch input and the second touch input, the electronic device analyzes the coordinates of touch areas and sets an arbitrary area (block 702). Specifically, the electronic device checks that the central coordinates of a first touch area and second touch area, which are touched by the user; generates four coordinates using the central coordinates of the first touch area and the central coordinates of the second touch area; and sets the arbitrary area by connecting the generated four coordinates. In the four coordinates, first coordinates are composed of the x-coordinate of the central coordinates of the first touch area and the y-coordinate of the central coordinates of the second touch area, and second coordinates are composed of the central coordinates of the second touch area. In addition, third coordinates are composed of the central coordinates of the first touch area, and fourth coordinates are composed of the x-coordinate of the central coordinates of the second touch area and the y-coordinate of the central coordinates of the first touch area.

When analyzing the coordinates of the touch areas and setting the arbitrary area, the electronic device checks that at least one list is included in the set area (step 703). Specifically, the electronic device receives the first touch input and the second touch input from the user, generates the arbitrary area, and checks that the at least one list is included in the generated arbitrary area. That is, the user may select a list the user wants to select among one or more lists displayed on the electronic device through touch inputs. In another flexible electronic device, a list intended for selection can not be selected by the touch inputs of the user. Specifically, in that other flexible electronic device, when the user attempts to select a list displayed on a touchscreen, the user has to make a separate behavior besides the touch inputs of the user, so that there is a problem that the number of interactions increases. However, in the electronic device according to the present disclosure, a list intended to select by the user can be selected only through touch inputs, thereby requiring no separate interaction.

Thereafter, the electronic device determines whether the electronic device is in a positive bending state (block 704). In this case, the positive bending state is defined as a state in which a portion set between the first touch area and the second touch area is convexly bent frontward. For example, if it is assumed that the set portion is the central vertical axis of the electronic device, the positive bending state can be defined as a state in which the central vertical axis is convexly bent frontward.

If it is determined that the electronic device is in the positive bending state, the electronic device converts the at least one list included in the set area into a text form and displays the same (block 705). Specifically, the electronic device checks that the electronic device is in the positive bending state, converts the all content of the list included in the set area into a text form, and displays the same. In this case, it is assumed that the above-described list is the simple content (list) of a text message, and a text is the all detailed content of the text message. That is, in the list, the transmitter, reception time and a part of detailed content of the text message are only displayed. When checking that the electronic device is in the positive bending state, the electronic device converts the list into the text including the all detailed content of the text message, and display the same. Therefore, the user selects the list of the text message the user wants to check through touch inputs, and then deforms the electronic device such that the set portion of the electronic device is convexly bent frontward, thereby checking the detailed content of the selected text message. Specifically, since the set portion is convexly bent frontward in the positive bending state, the user is uncomfortable to read the displayed text. As a result, it is preferable that the user deforms the electronic device to be in the flat state prior to the positive bending state such that the set portion, which had been convexly bent frontward, is to be flattened, and then checks the text.

If it is determined that the electronic device is not in the positive bending state (block 704), the electronic device determines whether the electronic device is in a negative bending state (block 706). In this case, the negative bending state is defined as a state in which the set portion between the first touch area and the second touch area is concavely bent backward. For example, if it is assumed that the set portion is the central vertical axis of the electronic device, the negative bending state can be defined as a state in which the central vertical axis is concavely bent backward.

If it is determined that the electronic device is in the negative bending state, the electronic device converts the at least one displayed text into a list form and displays the same (block 707). Specifically, after checking the detailed content of the text, the user deforms the electronic device from the flat state to the negative bending state, thereby converting the text displayed on the electronic device into the list form again. That is, the electronic device checks that the electronic device is in the negative bending state in which the set portion between the first touch area and the second touch area is concavely bent backward, converts the displayed text into the list form and displays the same. In the above-described example, the electronic device checks that the electronic device is in the negative bending state; converts the displayed text message having the text form into the list form again; and displays the same. As a result, after the user has checked the detailed text message, the user merely deforms the electronic device such that the set portion of the electronic device is concavely bent backward without a separate interaction, resulting in return to the previous list again. Specifically, since the set portion has been concavely bent backward in the negative bending state, the user is uncomfortable to read the displayed list. As a result, it is preferable that the user deforms the electronic device to be in the flat state prior to the negative bending state such that the set portion, which had been concavely bent backward, is to be flattened, and then checks the list. If it is determined that the electronic device is not in the negative bending state (block 706), the electronic device repeatedly performs the process of determining whether the electronic device is in the positive bending state.

Figure 8:
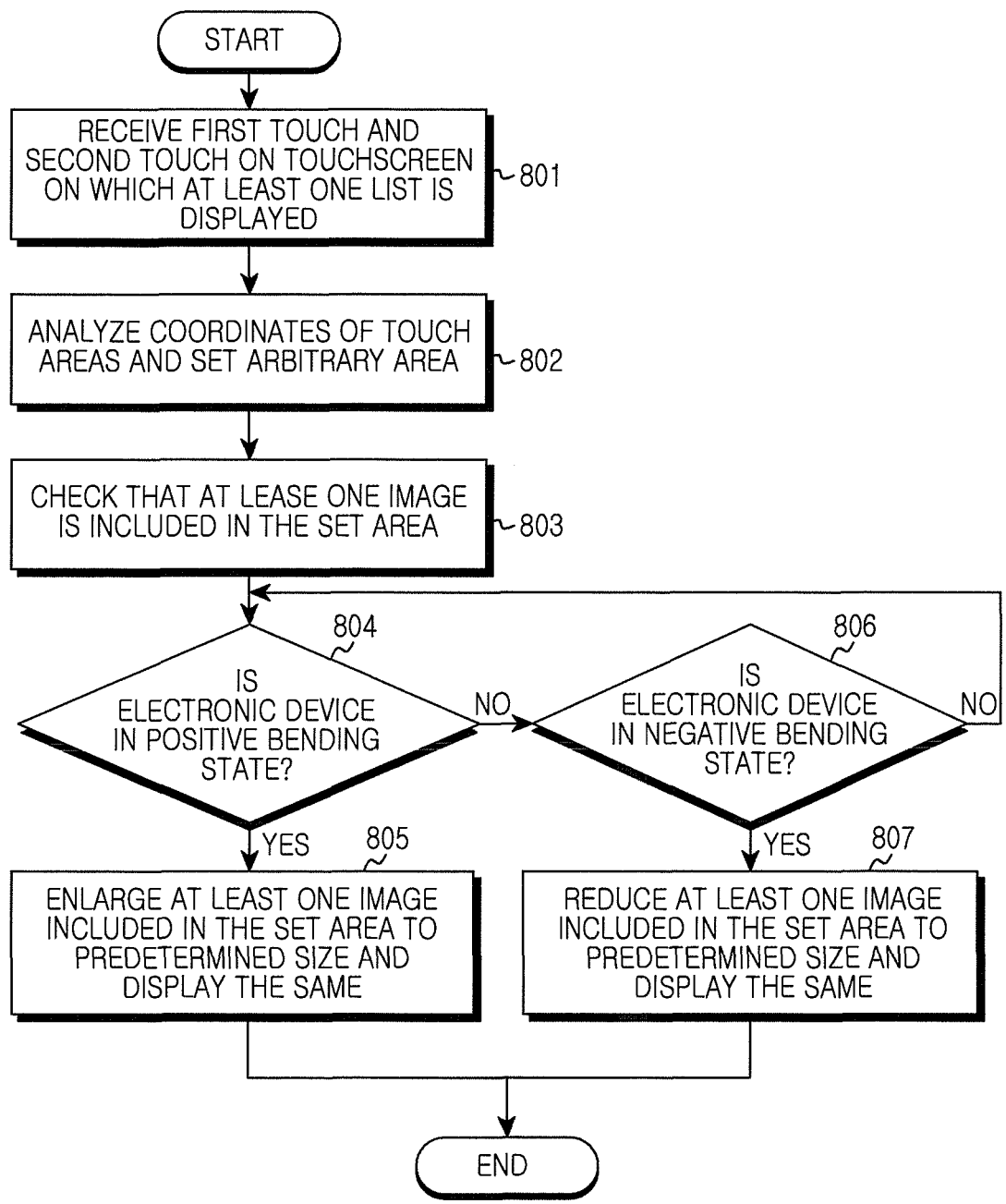
FIG. 8 illustrates a method for operating an electronic device according to embodiments of the present disclosure.

FIG. 8 illustrates a method for operating an electronic device according to embodiments of the present disclosure. As illustrated in FIG. 8, first, the electronic device receives a first touch and a second touch on a touchscreen on which at least one image is displayed (block 801). Specifically, the electronic device receives the first touch input and the second touch input by the two thumbs of a user. Of course, the electronic device receives the first touch input and the second touch input by other fingers of the user. However, the user may be most comfortable to hold the lower portions of the electronic device using the remaining four fingers with the thumbs touched on the touchscreen of the electronic device.

When receiving the first touch input and the second touch input, the electronic device analyzes the coordinates of touch areas and sets an arbitrary area (block 802). Specifically, the electronic device checks the central coordinates of a first touch area and second touch area, which are touched by the user, generates four coordinates using the central coordinates of the first touch area and the central coordinates of the second touch area, and sets an arbitrary area by connecting the generated four coordinates. In the four coordinates, first coordinates are composed of the x-coordinate of the central coordinates of the first touch area and the y-coordinate of the central coordinates of the second touch area, and second coordinates are composed of the central coordinates of the second touch area. In addition, third coordinates are composed of the central coordinates of the first touch area, and fourth coordinates are composed of the x-coordinate of the central coordinates of the second touch area and the y-coordinate of the central coordinates of the first touch area.

When analyzing the coordinates of the touch areas and setting the arbitrary area, the electronic device checks that at least one image is included in the set area (block 803). Specifically, the electronic device receives the first touch input and the second touch input from the user, generates the arbitrary area, and checks that the at least one image is included in the generated arbitrary area. That is, a user may select an image the user wants to select among one or more images displayed on the electronic device through touch inputs. In another flexible electronic device, an image intended for selection can not be selected by the touch inputs of the user. Specifically, in that other flexible electronic device, when the user attempts to select an image displayed on a touchscreen, the user has to make a separate behavior besides the touch inputs of the user, so that there is a problem that the number of interactions increases. However, in the electronic device according to the present disclosure, an image intended to select by the user can be selected only through touch inputs, thereby requiring no separate interaction.

Thereafter, the electronic device determines whether the electronic device is in a positive bending state (block 804). In this case, the positive bending state is defined as a state in which the set portion between the first touch area and the second touch area is convexly bent frontward. For example, if it is assumed that the set portion is the central vertical axis of the electronic device, the positive bending state can be defined as a state in which the central vertical axis is convexly bent frontward.

If it is determined that the electronic device is in the positive bending state, the electronic device enlarges the at least one image included in the set area to a predetermined size, and displays the same (block 805). Specifically, the electronic device checks that the electronic device is in the positive bending state; enlarges the image included in the set area to the predetermined size; and displays the same. That is, when it is determined that there is a need for enlargement of the image, such as when the image is displayed in a small size, which is difficult to see for the user, when the user wants to enlarge and see a specific portion of the image, and so on, the user deforms the electronic device such that the set portion of the electronic device is convexly bent frontward, thereby seeing the enlarged image. Specifically, since the set portion is convexly bent frontward in the positive bending state, the user is uncomfortable to see the enlarged image. As a result, it is preferable that the user deforms the electronic device to be in the flat state prior to the positive bending state such that the set portion, which had been convexly bent frontward, is to be flattened, and then see the enlarged image.

If it is determined that the electronic device is not in the positive bending state (block 804), the electronic device determines whether the electronic device is in a negative bending state (block 806). In this case, the negative bending state is defined as a state in which the set portion between the first touch area and the second touch area is concavely bent backward. For example, if it is assumed that the set portion is the central vertical axis of the electronic device, the negative bending state can be defined as a state in which the central vertical axis is concavely bent backward.

If it is determined that the electronic device is in the negative bending state, the electronic device reduces the at least one image included in the set area to a predetermined size, and displays the same (block 807). When seeing the image enlarged to the predetermined size, the user deforms the electronic device from the flat state to the negative bending state, thereby converting the enlarged image displayed on the electronic device into the image having the size prior to the enlargement again. That is, the electronic device checks that the electronic device is in the negative bending state in which the set portion between the first touch area and the second touch area is concavely bent backward, and converts the enlarged image displayed on the electronic device into the image having the size prior to the enlargement. As a result, after the user has seen the enlarged image, the user merely deforms the electronic device such that the set portion of the electronic device is concavely bent backward without a separate interaction, resulting in return to the image having the previous size again. Specifically, since the set portion is concavely bent backward in the negative bending state, the user is uncomfortable to see the reduced and displayed image. As a result, it is preferable that the user deforms the electronic device to be in the flat state prior to the negative bending state such that the set portion, which had been concavely bent backward, is to be flattened, and then sees the image. If it is determined that the electronic device is not in the negative bending state (block 806), the electronic device repeatedly performs the process of determining whether the electronic device is in the positive bending state (block 804).

Figure 9:
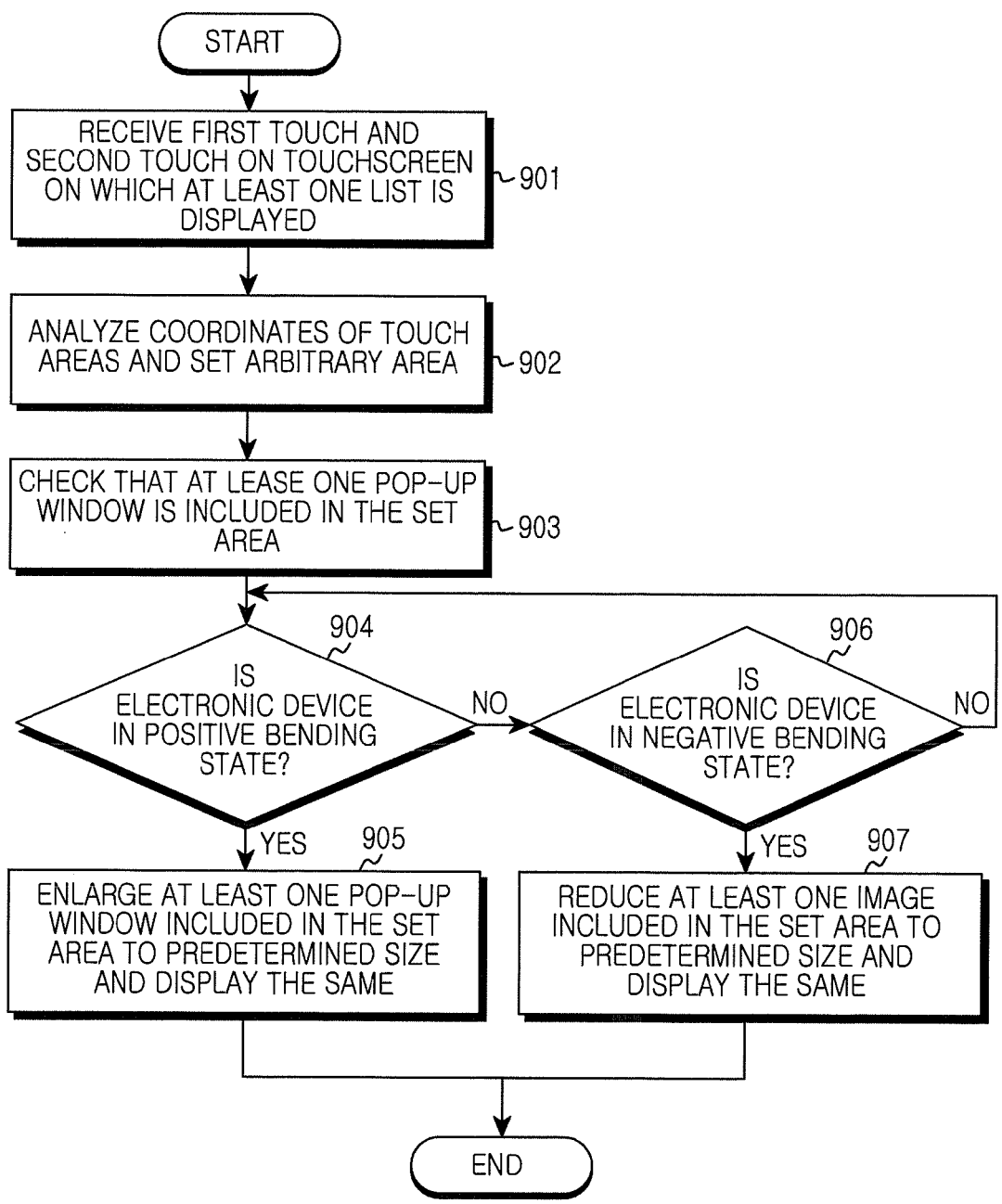
FIG. 9 illustrates a method for operating an electronic device according to embodiments of the present disclosure.

FIG. 9 illustrates a method for operating an electronic device according to embodiments of the present disclosure. As illustrated in FIG. 9, first, the electronic device receives a first touch and a second touch on a touchscreen on which at least one pop-up window is displayed (block 901). Specifically, the electronic device receives the first touch input and the second touch input by the two thumbs of a user. Of course, the electronic device can receive the first touch input and the second touch input by other fingers of the user. However, the user is most comfortable to hold the lower portions of the electronic device using the remaining four fingers with the thumbs touched on the touchscreen of the electronic device.

When receiving the first touch input and the second touch input, the electronic device analyzes the coordinates of touch areas and sets an arbitrary area (block 902). Specifically, the electronic device checks the central coordinates of a first touch area and second touch area, which are touched by the user, generates four coordinates using the central coordinates of the first touch area and the central coordinates of the second touch area, and sets the arbitrary area by connecting the generated four coordinates. In the four coordinates, first coordinates are composed of the x-coordinate of the central coordinates of the first touch area and the y-coordinate of the central coordinates of the second touch area, and second coordinates are composed of the central coordinates of the second touch area. In addition, third coordinates are composed of the central coordinates of the first touch area, and fourth coordinates are composed of the x-coordinate of the central coordinates of the second touch area and the y-coordinate of the central coordinates of the first touch area.

When analyzing the coordinates of the touch areas and setting the arbitrary area, the electronic device checks that at least one pop-up window is included in the set area (block 903). Specifically, the electronic device receives the first touch input and the second touch input from the user, generates the arbitrary area, and checks that the at least pop-up window is included within the generated arbitrary area. That is, the user may select a pop-up window the user wants to select among one or more pop-up windows displayed on the electronic device through touch inputs. In another flexible electronic device, a pop-up window intended for selection can not be selected by the touch inputs of the user. Specifically, in that other flexible electronic device, when the user attempts to select a pop-up window displayed on a touchscreen, the user has to make a separate behavior besides the touch inputs of the user, so that there is a problem that the number of interactions increases. However, in the electronic device according to the present disclosure, a pop-up window intended to select by the user can be selected only through touch inputs, thereby requiring no separate interaction.

Thereafter, the electronic device determines whether the electronic device is in a positive bending state (block 904). In this case, the positive bending state is defined as a state in which the set portion between the first touch area and the second touch area is convexly bent frontward. For example, if it is assumed that the set portion is the central vertical axis of the electronic device, the positive bending state can be defined as a state in which the central vertical axis is convexly bent frontward.

If it is determined that the electronic device is in the positive bending state, the electronic device enlarges the at least one pop-up window included in the set area to a predetermined size, and displays the same (block 905). Specifically, the electronic device checks that the electronic device is in the positive bending state; enlarges the pop-up window included in the set area to the predetermined size; and displays the same. That is, when the pop-up window is displayed in a small size, which is difficult to see for the user, and the user wants to increase the size of the media player to a predetermined area, the user deforms the electronic device such that the set portion is convexly bent frontward, thereby displaying the pop-up window enlarged to the predetermined area. Specifically, since the set portion is convexly bent frontward in the positive bending state, the user is uncomfortable to see the pop-up window enlarged to the determined area. As a result, it is preferable that the user deforms the electronic device to be in the flat state prior to the positive bending state such that the set portion, which had been convexly bent frontward, is to be flattened, and then checks the pop-up window.

If it is determined that the electronic device is not in the positive bending state (block 904), the electronic device determines whether the electronic device is in a negative bending state (step 906). In this case, the negative bending state is defined as a state in which the set portion between the first touch area and the second touch area is concavely bent backward. For example, if it is assumed that the set portion is the central vertical axis of the electronic device, the negative bending state can be defined as a state in which the central vertical axis is concavely bent backward.

If it is determined that the electronic device is in the negative bending state, the electronic device reduces the at least one pop-up window included in the set area to a predetermined size, and displays the same (block 907). After the user has enabled the pop-up window to be enlarged to the predetermined size, the user deforms the electronic device from the flat state to the negative bending state, thereby converting the enlarged pop-up window displayed on the electronic device into the pop-up window having the size prior to the enlargement again. That is, the electronic device checks that the electronic device is in the negative bending state in which the set portion between the first touch area and the second touch area is concavely bent backward, and converts the enlarged pop-up window displayed on the electronic device into the pop-up window having the size prior to the enlargement. As a result, after the user has enabled the pop-up window to be enlarged to the predetermined size, the user merely deforms the electronic device such that the set portion of the electronic device is concavely bent backward without a separate interaction, resulting in return to the pop-up window having the previous size again. Specifically, since the set portion is concavely bent backward in the negative bending state, the user is uncomfortable to see the reduced and displayed pop-up window. As a result, it is preferable that the user deforms the electronic device to be in the flat state prior to the negative bending state such that the set portion, which had been concavely bent backward, is to be flattened, and then checks the pop-up window. If it is determined that the electronic device is not in the negative bending state (block 906), the electronic device repeatedly performs the process of determining whether the electronic device is in the positive bending state (block 904).

Figure 10:
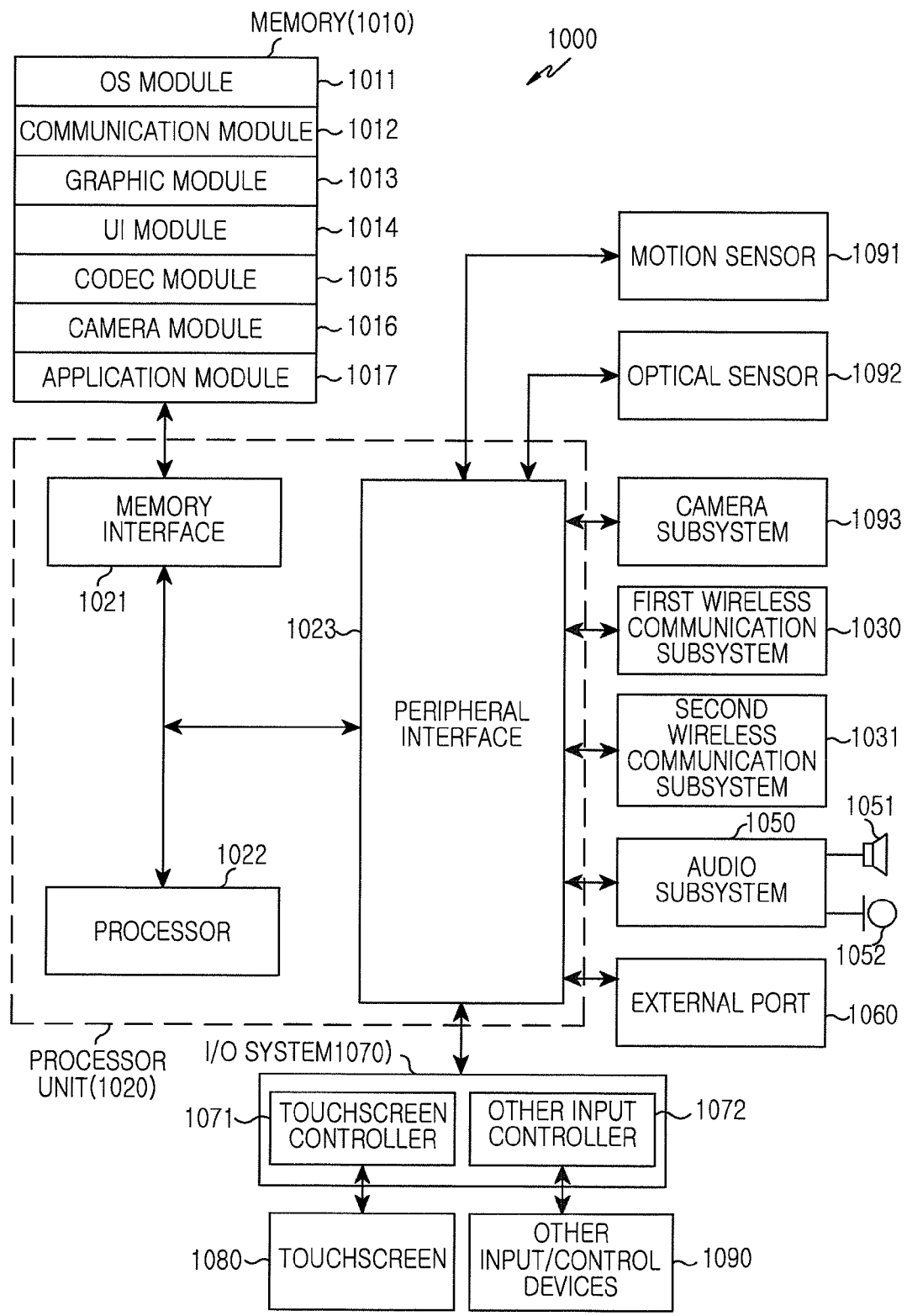
FIG. 10 illustrates a configuration of an electronic device according to embodiments of the present disclosure.

FIG. 10 illustrates a configuration of an electronic device according to embodiments of the present disclosure. Such an electronic device 1000 can be a portable electronic device, and examples thereof include a portable terminal, a mobile phone, a mobile pad, a media player, a tablet computer, a handheld computer, or a Personal Digital Assistant (PDA), and the like. In addition, the electronic device can be any one portable electronic device including a device having two or more functions among the above-described devices.

The electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an input/output (I/O) system 1070, a touchscreen 1080, and other input/control devices 1090. The memory 1010 and the external port 1060 can be provided in plurality.

The processor unit 1020 includes a memory interface 1021, at least one processor 1022, and a peripheral interface 1023. In some cases, the processor unit 1020 will also be referred to as a processor. According to the present disclosure, the processor unit 2010 analyzes the coordinates of touch areas to set an arbitrary area, checks that at least one object is included in the set area, and controls the layout of the at least one object included in the set area according to a bending state. Also, the processor unit 1020 checks the central coordinates of a first touch area and second touch area, generates four coordinates using the central coordinates of the first touch area and the central coordinates of the second touch area, and sets the arbitrary area by connecting the generated four coordinates. In addition, the processor unit 1020 generates first coordinates composed of the x-coordinate of the central coordinates of the first touch area and the y-coordinate of the central coordinates of the second touch area, second coordinates composed of the central coordinates of the second touch area, third coordinates composed of the central coordinates of the touch area, and fourth coordinates composed of the x-coordinate of the central coordinates of the second touch area and the y-coordinate of the central coordinates of the first touch area. The processor unit 1020 selects at least one object included in the set area, and checks that the electronic device is in a positive bending state in which a set portion between the first touch area and the second touch area is convexly bent forward, or that the electronic device is in a negative bending state in which the set portion between the first touch area and the second touch area is concavely bent backward. In addition, the processor unit 1020 checks that the set portion, which had been concavely bent backward, is in a flat state in which the electronic device is flattened.

The processor 1022 executes various software programs to perform various functions for the electronic device 1000, and performs processes and controls for voice communication and data communication. In addition to these general functions, the processor 1022 executes a specific software module (instruction set) stored in the memory 1010 and performs various specific functions corresponding to the software module. That is, the processor 1022 performs methods of embodiments of the present disclosure in cooperation with software modules stored in the memory 1010.

The processor 1022 includes at least one data processor, image processor, or codec. The data processor, the image processor, or the codec can be configured separately. Also, the processor 1022 can be configured by a plurality of processors performing different functions. The peripheral interface 1023 connects various peripheral devices and the I/O system 1070 of the electronic device 1000 to the processor 1022 and the memory 1010 (through the memory interface 921).

The various elements of the electronic device 1000 may be coupled by at least one communication bus (not illustrated) or stream line (not illustrated).

The external port 1060 is used for connection to other electronic devices directly or indirectly through a network (for example, Internet, intranet, or wireless LAN). The external port 1060 can be, for example, a universal serial bus (USB) port or a FireWire port, but is not limited thereto.

A motion sensor 1091 and an optical sensor 1092 may be connected to the peripheral interface 1023 to enable various functions. For example, the motion sensor 1091 and the optical sensor 1092 can be connected to the peripheral interface 1023 to detect a motion of the electronic device and detect light from the outside. In addition, other sensors such as a positioning system, a temperature sensor, and a biosensor can be connected to the peripheral interface 1023 to perform relevant functions.

A camera subsystem 1093 performs camera functions such as photographing and video clip recording.

The optical sensor 1092 includes a CCD (charged coupled device) or a CMOS (complementary metal-oxide semiconductor) device.

A communication function is performed through one or more wireless communication subsystems 1030 and 1031. The wireless communication subsystems 1030 and 1031 include a radio frequency (RF) receiver and transceiver and/or an optical (e.g., infrared) receiver and transceiver. The first wireless communication subsystem 1030 and the second wireless communication subsystem 1031 can be divided according to communication networks through which the electronic device 1000 communicate. For example, the communication networks includes, but is not limited to, communication subsystems operated through a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. In this case, since the present disclosure requires WiFi communication through the WiFi (Wireless Fidelity) network, the first wireless communication subsystem 1030 and the second wireless communication subsystem 1031 can be integrated with each other as one wireless communication subsystem.

The audio subsystem 1050 is connected to the speaker 1051 and the microphone 1052 to perform audio stream input/output functions such as voice recognition, voice replication, digital recording, and phone functions. That is, the audio subsystem 1050 communicates with the user through the speaker 1051 and the microphone 1052. The audio subsystem 1050 receives a data stream through the peripheral interface 1023 of the processor unit 1020 and converts the received data stream into an electric stream. The electric stream is transmitted to the speaker 1051. The speaker 1051 converts the electric stream into sound waves audible by humans and outputs the same. The microphone 1052 converts sound waves received from humans or other sound sources into an electric stream. The audio subsystem 1050 receives an electric stream converted from the microphone 1052. The audio subsystem 1050 converts the received electric stream into an audio data stream and transmits the audio data stream to the peripheral interface 1023. The audio subsystem 1050 includes an attachable/detachable earphone, a headphone, or a headset.

The I/O subsystem 1070 includes a touchscreen controller 1071 and/or an other input controller 1072. The touchscreen controller 1071 can be connected to the touchscreen 1080. The touchscreen 1080 and the touchscreen controller 1071 detect a touch, a motion, or a stop thereof by using multi-touch detection technologies including a proximity sensor array or other elements, as well as capacitive, resistive, infrared and surface acoustic wave technologies for determining one or more touch points with the touchscreen 1080. The other input controller 1072 can be connected to the other input/control devices 1090. The other input/control devices 1090 can include one or more buttons, a rocker switch, a thumb wheel, a dial, a stick, and/or a pointer device such as a stylus.

The touchscreen 1080 provides an I/O interface between the electronic device 1000 and the user. That is, the touchscreen 1080 transmits a user touch input to the electronic device 1000. Also, the touchscreen 1080 is a medium that displays an output from the electronic device 1000 to the user. That is, the touchscreen 1080 displays a visual output to the user. The visual output can be represented by a text, a graphic, a video, or a combination thereof.

The touchscreen 1080 can use various display technologies. For example, the touchscreen 1080 can use an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED). In the present disclosure, the touchscreen 1080 converts at least one list included in the set area into a text form respectively and displays the same, and converts at least one text into a list form and displays the same. In addition, the touchscreen 1080 enlarges at least one image or pop-up window included in the set area to a predetermined size and displays the same, and reduces the image or pop-up window enlarged to the predetermined size and displayed to the size before the enlargement and displays the same.

The memory 1010 is connected to the memory interface 1021. The memory 1010 can include one or more high-speed random-access memories (RAMs) such as magnetic disk storage devices, one more nonvolatile memories, one or more optical storage devices, and/or one or more flash memories (for example, NAND flash memories or NOR flash memories).

The memory 1010 stores software. Elements of the software include an operation system (OS) module 1011, a communication module 1012, a graphic module 1013, a user interface (UI) module 1014, a codec module 1015, a camera module 1016, and one or more application modules 1017. Also, since the module that is an element of the software may be represented as a set of instructions, the module may be referred to as an instruction set. The module may also be referred to as a program. The OS module 1011 (for example, WINDOWS, LINUX, Darwin, RTXC UNIX, OS X, or an embedded OS such as VxWorks) includes various software elements for controlling general system operations. For example, general system operation controls include memory control/management, storage hardware (device) control/management, and power control/management. The OS module also performs a function for enabling smooth communication between various hardware elements (devices) and software elements (modules).

The communication module 1012 enables communication with other electronic devices (such as computers, servers, and/or portable terminals) through the wireless communication subsystems 1030 and 1031 or the external port 1060.

The graphic module 1013 includes various software elements for providing and displaying graphics on the touchscreen 1080. The graphics include texts, web pages, icons, digital images, videos, and animations. In the present disclosure, the touchscreen 1080 displays a message about whether a smart rotation function is set, and receives a selection of a region included in the message.

The UI module 1014 includes various software elements related to a user interface. Through the user interface module, the electronic device provides information about how the state of a user interface changes and/or information about under what condition the state of a user interface changes.

The codec module 1015 includes software elements related to video file encoding/decoding. The codec module can include a video stream module such as an MPEG module or an H204 module. Also, the codec module can include various audio file codec modules such as AAA, AMR, and WMA. Also, the codec module 1015 includes an instruction set corresponding to the implementation methods of the present disclosure.

The camera module 1016 may include camera-related software elements that enable camera-related processes and functions.

The application module 1017 includes a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like.

In addition, various functions of the electronic device 1000 according to the present disclosure, which have been described above and will be described below, can be implemented by any combination of hardware and/or software including one or more stream processings and/or an application-specific integrated circuit (ASIC).

According to the electronic device and method for changing and displaying an object according to a bending state, the layout of at least one object located within a set area can be controlled according to a bending state.

While the disclosure has been shown and described certain embodiments, it will be understood by those skilled in the art that various changes in form and details may be made therein without departing from the spirit and scope of the invention as defined by the appended claims. Therefore, the scope of the invention is defined not by the detailed description of the drawings but by the appended claims, and differences within the scope will be construed as being included in the present disclosure.

What is claimed is:

1. A method for operating an electronic device, comprising:
    displaying a list comprising a plurality of shortened text messages on a flexible screen in respective cells, wherein each size of corresponding unshortened text messages exceeds a size of a respective cell of the list;
    receiving a selection of at least one shortened text message among the plurality of shortened text messages on the flexible screen in a significantly flat state; and
    in response to detecting a convex bending of the flexible screen, displaying an unshortened text message of the at least one shortened text message selected in the significantly flat state.

2. The method of claim 1, further comprising:
    checking central coordinates of a first touch area and a second touch area;
    generating four coordinates using the central coordinates of the first touch area and the central coordinates of the second touch area; and
    setting the arbitrary area by connecting the generated four coordinates.

3. The method of claim 2, wherein generating four coordinates using the central coordinates of the first touch area and the central coordinates of the second touch area includes:
    generating first coordinates composed of an x-coordinate of the central coordinates of the first touch area and a y-coordinate of the central coordinates of the second touch area;
    generating second coordinates composed of the central coordinates of the second touch area;
    generating third coordinates composed of the central coordinates of the first touch area; and
    generating fourth coordinates composed of an x-coordinate of the central coordinates of the second touch area and a y coordinate of the central coordinates of the first touch area.

4. The method of claim 1, wherein the full text message is returned to be the shortened text message in the list in response to detecting a concave bending of the flexible screen.

5. The method of claim 1, further comprising:
    selecting the at least one object included in the set area.

6. The method of claim 1, wherein the flexible screen is convexly bent frontward in a portion between the first touch area and the second touch area.

7. The method of claim 1, wherein the flexible screen is concavely bent backward in a portion between the first touch area and the second touch area.

8. The method of claim 1, further comprising:
checking that the electronic device is in a positive bending state in which a set portion between a first touch area and a second touch area is convexly bent frontward; and
converting at least one list included in the set area into a text form and displaying a relevant text.

9. The method of claim 8, further comprising:
checking that the electronic device is in a negative bending state in which the set portion between the first touch area and the second touch area is concavely bent backward; and
converting at least one displayed text into a list form and displaying a relevant list.

10. The method of claim 1, wherein controlling a layout of the at least one object included in the set area according to a bending state includes:
checking that the electronic device is in a positive bending state in which a set portion between a first touch area and a second touch area is convexly bent frontward; and
enlarging at least one image or pop-up window included in the set area to a predetermined size and displaying the enlarged image or pop-up window.

11. The method of claim 10, further comprising:
checking that the electronic device is in a flat state in which the set portion, which had been convexly bent frontward, is flattened.

12. The method of claim 10, further comprising:
checking that the electronic device is in the negative bending state in which the set portion between the first touch area and the second touch area is concavely bent backward; and
reducing the image or pop-up window which is enlarged to the predetermined size and displayed to a size prior to enlargement and displaying the reduced image or pop-up window.

13. The method of claim 12, further comprising:
checking that the electronic device is in a flat state in which the set portion, which had been concavely bent backward, is flattened.

14. An electronic device, comprising:
a flexible screen configured to display an image; and
a processor unit configured to:
display a list comprising a plurality of shortened text messages on the flexible screen in respective cells, wherein each size of corresponding unshortened text messages exceeds a size of a respective cell of the list;
receive a selection of at least one shortened text message among the plurality of shortened text messages on the flexible screen in a significantly flat state; and
in response to detecting a convex bending of the flexible screen, display an unshortened text message of the at least one shortened text message selected in the significantly flat state.

15. The electronic device of claim 14, wherein the processor unit is configured to:
check central coordinates of a first touch area and a second touch area, generates four coordinates using the central coordinates of the first touch area and the central coordinates of the second touch area, and
set the arbitrary area by connecting the generated four coordinates.

16. The electronic device of claim 15, wherein the processor unit is configured to generate:
first coordinates composed of a x coordinate of the central coordinates of the first touch area and a y coordinate of the central coordinates of the second touch area,
second coordinates composed of the central coordinates of the second touch area, third coordinates composed of the central coordinates of the touch area, and
fourth coordinates composed of a x coordinate of the central coordinates of the second touch area and a y coordinate of the central coordinates of the first touch area.

17. The electronic device of claim 14, wherein the full text message is returned to be the shortened text message in the list in response to detecting a concave bending of the flexible screen.

18. The electronic device of claim 14, wherein the processor unit is configured to select the at least one object included in the set area.

19. The electronic device of claim 14, wherein the flexible screen is convexly bent frontward in a portion between the first touch area and the second touch area.

20. The electronic device of claim 14, wherein the flexible screen is concavely bent backward in a portion between the first touch area and the second touch area.

21. The electronic device of claim 14, wherein the processor unit is configured to check that the electronic device is in a positive bending state in which a set portion between a first touch area and a second touch area is convexly bent frontward, and
wherein the electronic device further comprises a touchscreen configured to convert at least one list included in the set area into a text form and displaying a relevant text.

22. The electronic device of claim 21, wherein the processor unit is configured to check that the electronic device is in a negative bending state in which the set portion between the first touch area and the second touch area is concavely bent backward, and
wherein the touch screen is configured to convert at least one displayed text into a list form and displays a relevant list.

23. The electronic device of claim 14, wherein the processor unit is configured to check that the electronic device is in a positive bending state in which a set portion between a first touch area and a second touch area is convexly bent frontward, and
the electronic device further comprises a touchscreen configured to:
enlarge at least one image or pop-up window included in the set area to a predetermined size and
display the enlarged image or pop-up window.

24. The electronic device of claim 23, wherein the processor unit is configured to check that the electronic device is in a flat state in which the set portion, which had been convexly bent frontward, is flattened.

25. The electronic device of claim 23, wherein the processor unit is configured to check that the electronic device is in a negative bending state in which the set portion between the first touch area and the second touch area is concavely bent backward, and
wherein the touch screen is configured to:
reduce the image or pop-up window which is enlarged to the predetermined size and display to a size prior to enlargement and
display the reduced image or pop-up window.

26. The electronic device of claim 25, wherein the processor unit is configured to check that the electronic device is in a flat state in which the set portion, which had been concavely bent backward, is flattened.

* * * * *